(12) United States Patent
Kass

(10) Patent No.: US 10,216,632 B2
(45) Date of Patent: Feb. 26, 2019

(54) MEMORY SYSTEM CACHE EVICTION POLICIES

(71) Applicant: Michael Henry Kass, Berkeley, CA (US)

(72) Inventor: Michael Henry Kass, Berkeley, CA (US)

( * ) Notice: Subject to any disclaimer, the term of this patent is extended or adjusted under 35 U.S.C. 154(b) by 0 days.

(21) Appl. No.: 14/143,339

(22) Filed: Dec. 30, 2013

(65) Prior Publication Data

US 2015/0186274 A1   Jul. 2, 2015

(51) Int. Cl.
| | |
|---|---|
| *G06F 12/00* | (2006.01) |
| *G06F 12/0808* | (2016.01) |
| *G06F 12/122* | (2016.01) |
| *G06F 12/128* | (2016.01) |
| *G06F 12/0815* | (2016.01) |
| *G06F 12/121* | (2016.01) |
| *G06F 13/00* | (2006.01) |
| *G06F 13/28* | (2006.01) |
| *G06F 12/1009* | (2016.01) |

(52) U.S. Cl.
CPC ...... *G06F 12/0808* (2013.01); *G06F 12/0815* (2013.01); *G06F 12/121* (2013.01); *G06F 12/122* (2013.01); *G06F 12/128* (2013.01); *G06F 12/1009* (2013.01); *G06F 2212/502* (2013.01); *G06F 2212/62* (2013.01); *G06F 2212/683* (2013.01)

(58) Field of Classification Search
CPC .. G06F 12/121; G06F 12/128; G06F 12/0815; G06F 2212/502; G06F 2212/69; G06F 2212/683

USPC .......................................................... 711/135
See application file for complete search history.

(56) References Cited

U.S. PATENT DOCUMENTS

| | | | |
|---|---|---|---|
| 4,612,612 A | 9/1986 | Woffinden et al. | |
| 6,223,256 B1 * | 4/2001 | Gaither .................. | G06F 12/126 711/118 |

(Continued)

OTHER PUBLICATIONS

David S. Wise, et al., Language Support for Morton-order Matrices, Proceedings of the eighth ACM SIGPLAN symposium on Principles and practices of parallel programming, Jun. 18, 2001, pp. 24-33, ACM New York, NY, USA.

(Continued)

*Primary Examiner* — Mark A Giardino, Jr.
(74) *Attorney, Agent, or Firm* — Van Dyke Consulting; Korbin S Van Dyke

(57) ABSTRACT

A memory system implements a plurality of cache eviction policies and optionally a plurality of virtual address modification policies. A cache storage unit of the memory system has a plurality of cache storage sub-units. The cache storage unit is optionally managed by a cache management unit in accordance with the cache eviction polices. The cache storage sub-units are allocated for retention of information associated with respective memory addresses and are associated with the cache eviction policies in accordance with the respective memory addresses. For example, in response to a reference to an address that misses in a cache, the address is used to access a page table entry having an indicator specifying an eviction policy to use when selecting a cache line from the cache to evict in association with allocating a cache line of the cache to retain data obtained via the address.

30 Claims, 9 Drawing Sheets

(56) References Cited

U.S. PATENT DOCUMENTS

| | | | |
|---|---|---|---|
| 6,321,314 B1 | 11/2001 | Van Dyke | |
| 6,397,379 B1 | 5/2002 | Yates et al. | |
| 6,405,287 B1* | 6/2002 | Lesartre | 711/128 |
| 8,250,332 B2* | 8/2012 | Plondke et al. | 711/205 |
| 2002/0152335 A1 | 10/2002 | Holm et al. | |
| 2003/0070057 A1 | 4/2003 | Kakeda et al. | |
| 2004/0230762 A1 | 11/2004 | Allen et al. | |
| 2006/0129743 A1 | 6/2006 | Herrell et al. | |
| 2008/0180450 A1 | 7/2008 | Dowling | |
| 2008/0270741 A1 | 10/2008 | Tremaine | |
| 2008/0294868 A1 | 11/2008 | Rozas et al. | |
| 2009/0150642 A1* | 6/2009 | Heil et al. | 711/203 |
| 2012/0180072 A1 | 7/2012 | Sander et al. | |
| 2012/0313944 A1 | 12/2012 | Kontkanen et al. | |
| 2013/0275649 A1 | 10/2013 | Zhang et al. | |
| 2014/0082322 A1 | 3/2014 | Loh et al. | |
| 2014/0208064 A1 | 7/2014 | Basu et al. | |
| 2014/0281323 A1* | 9/2014 | Duluk, Jr. | 711/165 |
| 2015/0113379 A1 | 4/2015 | Wakefield et al. | |
| 2015/0154772 A1 | 6/2015 | Hasselgren et al. | |
| 2015/0186274 A1 | 7/2015 | Kass | |
| 2015/0186286 A1 | 7/2015 | Kass | |
| 2015/0186287 A1 | 7/2015 | Kass | |

OTHER PUBLICATIONS

K. Patrick Lorton, et al., Analyzing block locality in Morton-order and Morton-hybrid matrices, ACM SIGARCH Computer Architecture News, Sep. 2007, pp. 6-12, vol. 35 Issue 4, ACM New York, NY, USA.

Jan. 19, 2016 List of References Used in Art Rejections, U.S. Appl. No. 14/143,339, 1 page.

Xiao Zhang, et al., Towards Practical Page Coloring-based Multi-core Cache Management, 2009, ACM, 14 pages.

Yansong Zhang, et al., W-Order Scan: Minimizing Cache Pollution by Application Software Level Cache Management for MMDB, 2011, Springer-Verlag, 13 pages.

Sep. 1, 2016, List of References Used in Art Rejections, U.S. Appl. No. 14/143,339, 1 page.

Apr. 11, 2017, List of References Used in Art Rejections, U.S. Appl. No. 14/143,339, 1 page.

Sep. 22, 2017, List of References Used in Art Rejections, U.S. Appl. No. 14/143,339, 1 page.

\* cited by examiner

MEMORY SYSTEM CACHE EVICTION POLICIES

CROSS REFERENCE TO RELATED APPLICATIONS

Priority benefit claims for this application are made in the accompanying Application Data Sheet, Request, or Transmittal (as appropriate, if any). To the extent permitted by the type of the instant application, this application incorporates by reference for all purposes the following applications, all commonly owned with the instant application at the time the invention was made:

U.S. Non-Provisional application Ser. No. 14/143,369, filed herewith, first named inventor Michael Henry Kass, and entitled Memory System Address Modification Policies;

U.S. Non-Provisional application Ser. No. 14/143,397, filed herewith, first named inventor Michael Henry Kass, and entitled Providing Memory System Programming Interfacing; and U.S. Non-Provisional application Ser. No. 14/143,413, filed herewith, first named inventor Michael Henry Kass, and entitled Using Memory System Programming Interfacing.

BACKGROUND

Field

Advancements in memory systems, such as cache managing, are needed to provide improvements in cost, profitability, performance, efficiency, and utility of use.

Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

SYNOPSIS

The invention may be implemented in numerous ways, e.g., as a process, an article of manufacture, an apparatus, a system, a composition of matter, and a computer readable medium such as a computer readable storage medium (e.g., media in an optical and/or magnetic mass storage device such as a disk, an integrated circuit having non-volatile storage such as flash storage), or a computer network wherein program instructions are sent over optical or electronic communication links. The Detailed Description provides an exposition of one or more embodiments of the invention that enable improvements in cost, profitability, performance, efficiency, and utility of use in the field identified above. The Detailed Description includes an Introduction to facilitate understanding of the remainder of the Detailed Description. The Introduction includes Example Embodiments of one or more of systems, methods, articles of manufacture, and computer readable media in accordance with concepts described herein. As is discussed in more detail in the Conclusions, the invention encompasses all possible modifications and variations within the scope of the issued claims.

Figure 1A:
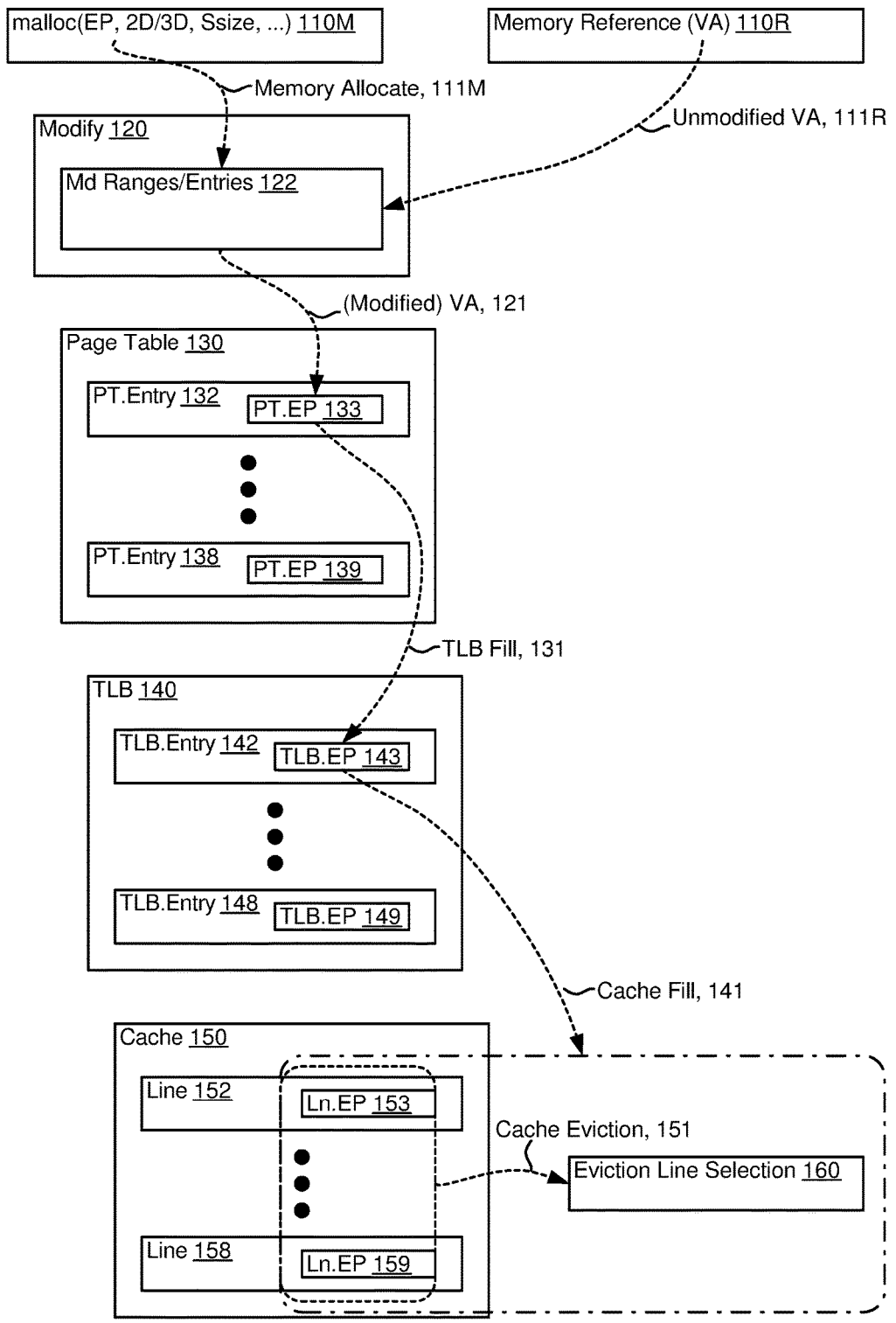
FIG. 1A illustrates selected details of concepts relating to various operating contexts and embodiments of a memory system that implements a plurality of cache eviction policies and/or a plurality of virtual address modification policies.

| List of Reference Symbols in Drawings | |
|---|---|
| Ref. Symbol | Element Name |
| 110M | malloc(EP, 2D/3D, Ssize, . . .) |
| 110R | Memory Reference (VA) |
| 111M | Memory Allocate |
| 111R | Unmodified VA |
| 120 | Modify |
| 121 | (Modified) VA |
| 122 | Modify (Md) Ranges/Entries |
| 130 | Page Table |
| 131 | TLB Fill |
| 132 | PT.Entry |
| 133 | PT.EP |
| 138 | PT.Entry |
| 139 | PT.EP |
| 140 | TLB |
| 141 | Cache Fill |
| 142 | TLB.Entry |
| 143 | TLB.EP |
| 148 | TLB.Entry |
| 149 | TLB.EP |
| 150 | Cache |
| 151 | Cache Eviction |
| 152 | Line |
| 153 | Ln.EP |
| 158 | Line |
| 159 | Ln.EP |

-continued

List of Reference Symbols in Drawings

| Ref. Symbol | Element Name |
|---|---|
| 160 | Eviction Line Selection |
| 170 | Virtual Address Space |
| 171 | EP1 |
| 171.1, 171.5, 171.6, 171.9 | Pages (Pg)s |
| 172 | Heap 1 (Hp1) |
| 173 | EP2 |
| 173.1, 173.9 | Pages (Pg)s |
| 175 | EP3 |
| 175.1, 175.9 | Pages (Pg)s |
| 176 | Heap 2 (Hp2) |
| 182 | 2D |
| 182.1, 182.5, 182.6, 182.9 | Elements |
| 183 | 3D |
| 183.1, 183.5, 183.6, 183.9 | Elements |
| 184 | Ssize1 |
| 185 | Ssize3 |
| 186 | Ssize2 |
| 187 | Ssize4 |
| 201 | Start |
| 202 | Determine Incoming Line Eviction Policy |
| 203 | Random? |
| 204 | Evict Selected Line |
| 205 | LRU Select Line for Eviction |
| 206 | Randomly Select Line for Eviction |
| 207 | Determine Trial Line for Eviction |
| 208 | Determine Trial Line Eviction Policy |
| 209 | Select Trial Line for Eviction |
| 249 | End |
| 251 | Start |
| 252 | Receive VA |
| 253 | Modify? |
| 254 | Pass VA Unmodified |
| 255 | Modify VA |
| 299 | End |
| 301 | Unmodified Array Addresses |
| 302 | Modified Array Addresses |
| 303 | Cache Line U |
| 304 | Cache Line M |
| 305 | Unmodified |
| 306 | Modified |
| 350.0 | $X_0Y_0$ |
| 350.1 | $X_1Y_0$ |
| 350.2 | $X_{M-2}Y_0$ |
| 350.3 | $X_{M-1}Y_0$ |
| 350.4 | $X_0Y_1$ |
| 350.5 | $X_1Y_1$ |
| 350.6 | $X_{M-2}Y_1$ |
| 350.7 | $X_{M-1}Y_1$ |
| 350.8 | $X_0Y_{N-2}$ |
| 350.9 | $X_1Y_{N-2}$ |
| 350.10 | $X_{M-2}Y_{N-2}$ |
| 350.11 | $X_{M-1}Y_{N-2}$ |
| 350.12 | $X_0Y_{N-1}$ |
| 350.13 | $X_1Y_{N-1}$ |
| 350.14 | $X_{M-2}Y_{N-1}$ |
| 350.15 | $X_{M-1}Y_{N-1}$ |
| 351 | NW Corner |
| 355 | M Columns |
| 356 | N Rows |
| 400 | Computer System |
| 401 | Computer |
| 402 | I/O Device(s) |
| 410 | Processor |
| 420 | CPU |
| 421 | IF |
| 422 | ID |
| 423 | ALU |
| 424 | CR |
| 425 | iTLB |
| 426 | AGU |
| 427 | AMU |
| 428 | dTLB |
| 429 | LSU |
| 430 | L1 |
| 431 | I$ |
| 432 | D$ |
| 440 | L2 |
| 450 | L3 |
| 460 | Main Memory Controller |
| 470 | Main Memory |
| 480 | Data |
| 481 | 2D |
| 482 | 3D |
| 483 | Heap 1 (Hp1) |
| 484 | PT1 |
| 485 | Heap 2 (Hp2) |
| 486 | PT2 |
| 490 | Programs |
| 491 | OS |
| 510 | Entries |
| 512 | Entry |
| 513 | TLB.EP |
| 518 | Entry |
| 519 | TLB.EP |
| 520 | TLB Control (TLBctrl) |
| 530 | D$ Lines |
| 532 | D$ Line |
| 533 | D$ Line EP (DLn.EP) |
| 538 | D$ Line |
| 539 | D$ Line EP (DLn.EP) |
| 540 | D$ Control (D$ctrl) |
| 601 | Generated VA |
| 602 | Ssize |
| 603 | 2D/3D |
| 604 | Modify Address |
| 610 | 2D Dilate/Interleave |
| 620 | 3D Dilate/Interleave |
| 630 | 2D/3D Mux |
| 640 | Pass/Modify Mux |
| 650 | VA Modify Policy Compare |
| 699 | (Modified) VA |
| 602XY | Ssize.X\|\|Ssize.Y |
| 602XYZ | Ssize.X\|\|Ssize.Y\|\|Ssize.Z |

DETAILED DESCRIPTION

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (such as: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, system, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Acronyms

At least some of the various shorthand abbreviations (e.g. acronyms) defined here refer to certain elements used herein.

| Acronym | Description |
| --- | --- |
| AGU | Address Generation Unit |
| ALU | Arithmetic Logical Unit |
| AMU | Address Modification Unit |
| API | Application Programming Interface |
| AR | Adaptive Replacement |
| BIOS | Basic Input/Output System |
| CAD | Computer-Aided Design |
| CAM | Computer-Aided Manufacturing |
| CAR | Clock with Adaptive Replacement |
| CG | Computer Graphics |
| CPU | Central Processing Unit |
| CR | Control Register |
| DRAM | Dynamic Random Access (read/write) Memory |
| EC | Example Combination |
| EP | Eviction Policy |
| Esize | Element-size |
| FIFO | First In First Out |
| I/O | Input/Output |
| LAN | Local Area Network |
| LFU | Least-Frequently Used |
| LIRS | Low Inter-reference Recency Set |
| LRU | Least-Recently Used |
| LSU | Load/Store Unit |
| MRU | Most Recently Used |
| OS | Operating System |
| PT | Page Table |
| SRAM | Static Random Access (read/write) Memory |
| Ssize | Structure-size |
| TLB | Translation Look-aside Buffer |
| VA | Virtual Address |
| WAN | Wide Area Network |

A memory system implements a plurality of cache eviction policies, a plurality of virtual address modification policies, or both.

In a first aspect, a cache storage unit of the memory system has a plurality of cache storage sub-units. The cache storage unit is optionally managed by a cache management unit in accordance with the cache eviction polices. The cache storage sub-units are allocated for retention of information associated with respective memory addresses and are associated with the cache eviction policies in accordance with the respective memory addresses. For example, in response to a reference to an address that misses in a cache, the address is used to access a page table entry having an indicator specifying an eviction policy to use when selecting a cache line from the cache to evict in association with allocating a cache line of the cache to retain data obtained via the address.

In a second aspect, virtual addresses are optionally, selectively, and/or conditionally modified by the memory system in accordance with a plurality of virtual address modification policies. The virtual address modification policies include no modification, modification according to two-dimensional Morton ordering, and modification according to three-dimensional Morton ordering. For example, in response to a reference to a particular virtual address, the particular virtual address is modified according to two-dimensional Morton ordering so that at least two elements in a same column and distinct respective rows of a two-dimensional data structure are loaded into a same cache line and/or are referenced via a same page table entry.

In a third aspect, one or more application programming interfaces provide access to memory allocation and parameters thereof relating to zero or more cache eviction policies and/or zero or more virtual address modification policies associated with memory received via a memory allocation request. The provided application programming interfaces are usable by various software elements, such as any one or more of basic input/output system, driver, operating system, hypervisor, and application software elements. Memory allocated via the application programming interfaces is optionally managed via one or more heaps, such as one heap per unique combination of values for each of any one or more parameters including eviction policy, virtual address modification policy, structure-size, and element-size parameters.

In a fourth aspect, one or more application programming interfaces are used for memory allocation via parameters thereof relating to zero or more cache eviction policies and/or zero or more virtual address modification policies associated with memory received via a memory allocation request. The application programming interfaces are usable by various software elements, such as any one or more of basic input/output system, driver, operating system, hypervisor, and application software elements. Memory allocated via the application programming interfaces is optionally managed via one or more heaps, such as one heap per unique combination of values for each of any one or more parameters including eviction policy, virtual address modification policy, structure-size, and element-size parameters.

An example of Morton ordering is mapping multidimensional data (e.g. 2D or 3D data) into a single dimension having locality of data with respect to more than one of the dimensions. Morton ordering is sometimes referred to as Z-order(ing).

An example computer system includes computer(s) coupled to I/O device(s). An example computer is enabled to store and process data according to program(s), and includes processor(s) coupled to main memory. Example I/O devices include storage systems (e.g. tape, disk, and various systems enabled to retain information in relatively large quantities), communication systems (e.g. LAN, WAN, connectivity to the Internet, and various systems enabled to communicate with other computer systems), and human interaction systems (e.g. keyboard, display, touchpad, and various systems enabled to interact with human users). Example data includes information from/to the main memory and/or the I/O devices, such as produced and/or consumed by the programs. Example programs include BIOS, driver, OS, hypervisor, and application software such as implementing one or more image processing operations.

An example processor is enabled to reference the data and execute instructions of the programs, and includes CPU(s), cache(s), and main memory controller(s). Example main memory is enabled to store the data and the programs, implemented via volatile memory (e.g. DRAM and/or SRAM) and/or non-volatile memory (e.g. flash) and is accessible to the CPUs via instruction fetch of the instructions and execution of memory references of the instructions. An example CPU is hardware that processes the instructions by performing operations (e.g. arithmetic, logical, address calculation, and memory reference) specified by the instructions.

Examples of the hardware include instruction fetcher(s)/decoder(s), ALU(s), AGU(s), TLB(s), LSU(s), control unit(s), and various logic circuitry elements enabled to perform processing relating to various aspects of instruction fetching and executing. An example cache is enabled to retain information (e.g. all or any portions of the data and/or the instructions) and includes storage as well as control elements. An example main memory controller is enabled to interface CPU(s) and/or cache(s) to main memory storage elements.

In various embodiments, all or any portions of one or more computer systems are implemented in one or more discrete silicon devices. In various embodiments, all or any portions of one or more CPUs and zero or more caches accessible by the CPUs are implemented in one or more discrete silicon devices. In some contexts, the discrete silicon devices are referred to as "chips". In some contexts, a CPU (and optionally one or more caches) is referred to as a "core".

Some caches are characterized according to type of information retained therein. For example, an instruction (only) cache is used to retain various portions of the instructions without retaining any of the data. For another example, a data (only) cache is used to retain various portions of the data without retaining any of the instructions. For another example, a combined cache (sometimes referred to as a unified cache) is used to retain various portions of the instructions as well as various portions of the data. Some caches are characterized according to latency of access by the CPUs (e.g. how many clocks of the CPU elapse between a request from the CPU and a response from the cache). For example, a zero-level cache (e.g. a program execution trace cache) has a relatively short access latency. A first-level cache (e.g. an instruction cache such as dedicated to a single CPU) has a relatively longer access latency compared to the zero-level cache. A second-level cache (e.g. a combined cache shared by a plurality of CPUs) has a relatively longer access latency compared to the first-level cache. A third-level cache has a relatively longer access latency compared to the second-level cache, and so forth.

Some caches are characterized by how many locations of the cache are usable to retain a particular portion of main memory (e.g. degree of associativity). For example, a direct mapped cache (e.g. one-way associative cache) is enabled to retain a particular portion of main memory in a single location of the direct mapped cache. For another example, a fully associative cache is enabled to retain a particular portion of main memory in any location of the fully associative cache. For another example, various partially associative caches include a two-way set associative cache that is enabled to retain a particular location of main memory in any of two locations of the two-way set associative cache, and a four-way set associative cache that is enabled to retain a particular location of main memory in any of four locations of the four-way set associative cache.

Some caches that are more than one-way associative (e.g. fully associative, two-way associative, four-way associative, and so forth) are characterized by one or more policies associated with allocation of storage of the cache to information entering the cache. For example, an instruction cache has an allocation policy of allocate on miss, such that an instruction fetch that misses in the instruction cache (e.g. instructions satisfying the instruction fetch are not found in the instruction cache) results in allocation of storage in the instruction cache for instructions that satisfy the instruction fetch. The instructions that satisfy the instruction fetch are read from one or more main memory storage elements and copied into the allocated storage. For another example, a data cache has an allocation policy of allocate on write, such that a memory store instruction referencing a particular address that misses in the data cache (e.g. there is no storage in the data cache allocated to the particular address) results in allocation of storage in the data cache for data of the memory store instruction (e.g. data to be written into the particular address). The data of the memory store instruction is then written into the allocated storage.

Some caches that are more than one-way associative (e.g. two-way and four-way set associative caches) have one or more policies associated with eviction of information from the cache, such as to free some of the storage for allocating to retaining the entering information. Example cache eviction policies are random, LRU, LFU, segmented LRU, MRU, LIRS, AR, CAR, and FIFO eviction policies. Some cache eviction policies are characterized with respect to type of selection. For example, some cache eviction policies are characterized variously as pseudo-random (e.g. statistically random while being deterministically generated), approximate (e.g. estimated with respect to a particular algorithm), and exact (e.g. accurate with respect to a particular algorithm).

Some computers implement virtual memory, e.g. via one or more data structures such as page table(s) to enable translation from virtual addresses to physical addresses. Example virtual addresses are produced by processor(s) of a computer when fetching instructions and/or when executing memory reference of the instructions, such as via execution of memory load and/or store instructions. Some page tables include one or more entries each describing at least in part how to determine a physical address given a virtual address. Example page tables include a single-level page table, a multiple-level page table, one or more page tables describing pages all of a same size, and one or more page tables describing pages of varying sizes.

Some CPUs cache one or more of the translations of virtual to physical addresses (e.g. as implemented via one or more data structures such as page tables) in hardware such as one or more TLBs. Some TLBs include one or more entries each caching at least some information about at least one of the translations. Example TLBs include a single TLB, a plurality of TLBs, one or more instruction TLBs, one or more data TLBs, one or more micro-TLBs, one or more full-size TLBS, one or more TLBs filled wholly or partially by hardware, and one or more TLBs filled wholly or partially by software.

Some cache implementations include a cache storage unit having one or more included sub-units (such as one or more cache lines) managed by a management unit (e.g. one or more control modules). Some TLB implementations include a TLB storage unit having one or more included sub-units (such as one or more TLB entries) managed by a management unit (e.g. one or more control modules).

Some CPUs provide for one or more virtual address modification policies, applied in conjunction with generation of a virtual address (e.g. via hardware such as an LSU) and translation to a physical address (e.g. via hardware such as a TLB). Example virtual address modification policies are no modification, modification according to two-dimensional Morton ordering, and modification according to three-dimensional Morton ordering. Some virtual address modification policies are characterized according to a structure-size parameter, such as a number of elements in a dimension of a data structure or a log base two of same.

Various usage scenarios of computer systems include servers (e.g. storage servers, compute servers, transaction servers, and networking servers), workstations (e.g. CAD stations, CAM stations, and graphics rendering workstations), personal computers (e.g. desktop computers, laptop computers, and tablet computers), communication devices (e.g. phones such as corded, cordless, and/or cell phones, routers, and switches), entertainment devices (e.g. hand-held game consoles, table-top game consoles, and media devices such as cameras and/or video/audio playback/recorders), and automotive electronics (e.g. control electronics such as brake controllers and/or engine controllers, display electronics, and audio electronics).

As a specific example of an operating context of a memory system, an instruction cache retains a dynamic subset of instructions, a data cache retains a dynamic subset of data, and main memory storage elements retain an entirety of the instructions and an entirety of the data. A main memory controller interfaces the instruction cache, the data cache, and a CPU to the main memory storage elements. The data cache and the instruction cache are accessible to the CPU in relatively fewer clock cycles of the CPU than the main memory storage elements are accessible to the CPU. The data cache and the instruction cache are implemented via SRAM devices (e.g. in a same fabrication technology as the CPU), and the main memory storage elements are implemented via DRAM devices (e.g. in a different fabrication technology as the CPU). The data cache and the instruction cache are managed in accordance with a plurality of cache eviction policies, optionally exposed for use by software via one or more APIs. Concluding with the specific example operating context, combined storage space of the instruction cache and the data cache is less than storage space of the main memory storage elements. As a variant of the specific example operating context, the main memory storage elements retain a dynamic subset of the instructions and the data, with other-than the dynamic subset being retained by an I/O device (such as a storage system having a disk). Concluding with the variant, virtual addresses are translated in accordance with one or more page tables as cached by one or more TLBs, and possibly modified in accordance with a plurality of virtual address modification policies, optionally exposed for use by software via one or more APIs.

Example Embodiments

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims and their equivalents.

EC1) A method comprising:
  determining an eviction policy associated with information to be retained in a cache;
  selecting a line to evict from the cache based at least in part on the eviction policy; and
  wherein the determining is based at least in part on an address associated with the information.

EC2) The method of EC1, wherein the address is a virtual address and the determining is at least in part via at least one entry of at least one page table.

EC3) The method of EC1, wherein the address is a virtual address and the determining is at least in part via at least one access of at least one entry of a TLB.

EC4) The method of EC1, wherein the determining is at least in part via one or more programmable registers indicating one or more address ranges to compare to the address associated with the information.

EC5) An apparatus comprising:
  first one or more hardware logic units enabled to determine an eviction policy associated with information to be retained in a cache;
  second one or more hardware logic units enabled to select a line to evict from the cache based at least in part on the eviction policy; and
  wherein the determination of the eviction policy is based at least in part on an address associated with the information.

EC6) The apparatus of EC14, wherein the first one or more hardware logic units comprise all or any portions of one or more programmable registers of a processor comprising the first and the second one or more hardware logic units.

EC7) The apparatus of EC14, wherein the first one or more hardware logic units comprise all or any portions of a TLB of a processor comprising the first and the second one or more hardware logic units.

EC8) A tangible non-transitory computer readable medium having a set of instructions stored therein that when executed by a processing element cause the processing element to perform and/or control operations comprising:
  determining an eviction policy associated with information to be retained in a cache of a processor of the processing element;
  selecting a line to evict from the cache based at least in part on the eviction policy; and
  wherein the determining is based at least in part on an address associated with the information.

EC9) The tangible non-transitory computer readable medium of EC8, wherein the determining is at least in part via one or more programmable registers of the processor.

EC10) The tangible non-transitory computer readable medium of EC8, wherein the determining is at least in part via a TLB of the processor.

EC11) A system comprising:
  means for determining an eviction policy associated with information to be retained in a cache;
  means for selecting a line to evict from the cache based at least in part on the eviction policy; and
  wherein the means for determining is responsive to at least a portion of an address associated with the information.

EC12) The system of EC11, wherein the means for determining comprises one or more programmable registers.

EC13) The system of EC11, wherein the means for determining comprises at least one TLB.

EC14) An apparatus comprising:
  a cache storage unit comprising a plurality of cache storage sub-units;

a cache management unit enabled to manage the cache storage unit according to a plurality of cache eviction policies; and wherein the cache storage unit is enabled to selectively associate a particular one of the cache eviction policies with a particular one of the cache storage sub-units based at least in part on a memory address associated with information to be retained in the particular cache storage sub-unit.

EC15) An apparatus comprising:
a cache storage unit comprising a plurality of cache storage sub-units;
a cache management unit enabled to manage the cache storage unit according to a plurality of cache eviction policies; and
wherein the cache management unit is enabled to selectively associate a particular one of the cache eviction policies with a particular one of the cache storage sub-units in association with allocation of the particular cache storage sub-unit.

EC16) An apparatus comprising:
a cache storage unit comprising a plurality of cache storage sub-units;
a cache management unit enabled to manage the cache storage unit according to a plurality of cache eviction policies; and
wherein the cache management unit is enabled to select a particular one of the cache storage sub-units to evict based at least in part on a particular one of the cache eviction policies selectively associated with the particular cache storage sub-unit.

EC17) The apparatus of EC14, EC15, or EC16, wherein the selectively associate is at least in part via the cache storage unit.

EC18) The apparatus of EC14, EC15, or EC16, wherein the selectively associate is at least in part via one or more of the cache storage sub-units.

EC19) The apparatus of EC14, EC15, or EC16, wherein the selectively associate is at least in part via information from one or more page tables.

EC20) The apparatus of EC14, EC15, or EC16, wherein the selectively associate is at least in part via information from one or more page table entries.

EC21) The apparatus of EC14, EC15, or EC16, wherein the selectively associate is at least in part via one or more programmable registers.

EC22) The apparatus of EC14, EC15, or EC16, wherein the selectively associate is at least in part via one or more processor control registers enabled to store one or more address ranges.

EC23) The apparatus of EC14, EC15, or EC16, wherein the selectively associate is at least in part via a TLB.

EC24) The apparatus of EC14, EC15, or EC16, wherein any one of a data cache and an instruction cache comprise the cache storage unit.

EC25) The apparatus of EC14, EC15, or EC16, wherein any one of an innermost-level cache and an outer-level cache comprises the cache storage unit.

EC26) The apparatus of EC14, EC15, or EC16, wherein at least some of the cache storage sub-units correspond to respective lines of a cache comprising the cache storage unit and the cache management unit.

EC27) A method comprising:
determining, based at least in part on a first portion of a virtual address and independently of a second portion of the virtual address, a first portion of a physical address and a particular address mode of a plurality of address modes;
computing, based at least in part on the second portion of the virtual address and the particular address mode, a second portion of the physical address; and
referencing physical storage at a location specified at least in part by the first and the second portions of the physical address.

EC28) The method of EC27, further comprising generating the virtual address.

EC29) The method of EC27, wherein the virtual address comprises the first portion of the virtual address concatenated with the second portion of the virtual address.

EC30) The method of EC27, wherein the determining is via a Translation Look-aside Buffer (TLB).

EC31) The method of EC27, wherein the determining is via one or more programmable registers.

EC32) The method of EC27, wherein the first portion of the virtual address and the first portion of the physical address are respective more significant portions, and the second portion of the virtual address and the second portion of the physical address are respective less significant portions.

EC33) The method of EC27, wherein the physical storage comprises at least one of a cache and a main memory.

EC34) The method of EC27, wherein the physical storage comprises at least one of a static memory and a dynamic memory.

EC35) The method of EC27, wherein the address modes comprise an unmodified address mode and one or more modified address modes.

EC36) The method of EC35, wherein the unmodified address mode is one of a row major address mode and a column major address mode.

EC37) The method of EC35, wherein the modified address modes comprise a two-dimensional Morton address mode and a three-dimensional Morton address mode.

EC38) The method of EC35, wherein the modified address modes comprise any one or more Morton address modes corresponding respectively to any one or more multiple dimensions, the multiple dimensions comprising two dimensions, three dimensions, four dimensions, five dimensions, and so forth.

EC39) The method of EC35, wherein the computing comprises conditionally formulating the second portion of the physical address as identical to the second portion of the virtual address when the particular address mode is the unmodified address mode.

EC40) The method of EC35, wherein the computing comprises conditionally formulating the second portion of the physical address as a dilating and interleaving of portions of the second portion of the virtual address when the particular address mode is one of the modified address modes.

EC41) The method of EC40, wherein the dilating and interleaving are in accordance with any one or more of a dimension indicator, a structure-size indicator, and an element-size indicator.

EC42) The method of EC41, wherein at least one of
the dimension indicator indicates any one of a plurality of integers each greater than or equal to two,
the structure-size indicator indicates any one of a first plurality of powers of two, and
the element-size indicator indicates any one of a second plurality of powers of two.

EC43) The method of EC35, wherein the physical storage comprises at least one cache line, and the referencing comprises filling the at least one cache line with data from a same column and at least two distinct rows of a data structure organized to hold two-dimensional data.

EC44) An apparatus comprising:
first one or more hardware logic units enabled to determine, based at least in part on a first portion of a virtual address and independently of a second portion of the virtual address, a first portion of a physical address and a particular address mode of a plurality of address modes;
second one or more hardware logic units enabled to compute, based at least in part on the second portion of the virtual address and the particular address mode, a second portion of the physical address; and
third one or more hardware logic units enabled to reference physical storage at a location specified at least in part by the first and the second portions of the physical address.

EC45) The apparatus of EC63, wherein one or more of the first, the second, and the third hardware logic units comprise circuitry in common with at least one other of the first, the second, and the third one or more hardware logic units.

EC46) A tangible non-transitory computer readable medium having a set of instructions stored therein that when executed by a processing element cause the processing element to perform and/or control operations comprising:
determining, based at least in part on a first portion of a virtual address and independently of a second portion of the virtual address, a first portion of a physical address and a particular address mode of a plurality of address modes;
computing, based at least in part on the second portion of the virtual address and the particular address mode, a second portion of the physical address; and
referencing physical storage at a location specified at least in part by the first and the second portions of the physical address.

EC47) The tangible non-transitory computer readable medium of EC65, wherein the computing is at least in part via an address modification unit of a processor of the processing element.

EC48) A system comprising:
means for determining, based at least in part on a first portion of a virtual address and independently of a second portion of the virtual address, a first portion of a physical address and a particular address mode of a plurality of address modes;
means for computing, based at least in part on the second portion of the virtual address and the particular address mode, a second portion of the physical address; and
means for referencing physical storage at a location specified at least in part by the first and the second portions of the physical address.

EC49) The system of EC67, wherein at least one of the means for determining, the means for computing, and the means for referencing are implemented at least in part via hardware logic circuitry embodied on a discrete silicon device.

EC50) A method comprising:
generating at least two virtual addresses;
determining respective address modification policies for each of the virtual address via an address modification policy hardware logic unit;
in response to the respective address modification policies, modifying each of the virtual addresses to produce respective modified virtual addresses; and
wherein the method is performed by a processor comprising the address modification policy hardware logic unit.

EC51) The method of EC50, further comprising mapping each of the respective modified virtual addresses to respective physical addresses based on information obtained from a same page table entry accessible via the processor.

EC52) The method of EC51, wherein the mapping is at least in part via a TLB of the processor and the determining is at least in part via the TLB.

EC53) The method of EC51, wherein the mapping is at least in part via a TLB of the processor and the determining is in part via one or more programmable registers that are distinct from the TLB.

EC54) The method of EC50, further comprising mapping each of the respective modified virtual addresses to respective physical addresses cacheable in a cache of the processor, and wherein the virtual addresses span a range that is greater than a maximum physical address range that is spanned by a line of the cache and the respective modified virtual addresses span a range that is not greater than the maximum physical address range.

EC55) The method of EC50, wherein the virtual addresses span a range that is greater than a maximum virtual address range that is spanned by a page table entry for a particular size page accessible via the processor and the respective modified virtual addresses span a range that is not greater than the maximum virtual address range.

EC56) The method of EC50, wherein each of the virtual addresses identify a respective data element of respective rows of a column major data structure.

EC57) The method of EC50, wherein each of the virtual addresses identify a respective data element of respective columns of a row major data structure.

EC58) The method of EC50, wherein the generating is in response to a single instruction executable by the processor.

EC59) The method of EC50, wherein the generating is in response to a plurality of instructions executable by the processor.

EC60) The method of EC50, wherein the modifying is via an address modification hardware logic unit of the processor responsive to any one or more of a dimension indicator, a structure-size indicator, and an element-size indicator.

EC61) The method of EC60, wherein at least one of
the dimension indicator indicates any one of a plurality of integers each greater than or equal to two,
the structure-size indicator indicates any one of a first plurality of powers of two, and
the element-size indicator indicates any one of a second plurality of powers of two.

EC62) The method of EC50, wherein the modifying comprises any one or more of dilating and interleaving of bits of the virtual addresses.

EC63) An apparatus comprising:
first one or more hardware logic units enabled to generate at least two virtual addresses;
second one or more hardware logic units enabled to determine respective address modification policies for each of the virtual address;
third one or more hardware logic units enabled to, in response to the respective address modification policies, modify each of the virtual addresses to produce respective modified virtual addresses; and wherein a processor comprises the first, the second, and the third one or more hardware logic units.

EC64) The apparatus of EC63, wherein one or more of the first, the second, and the third hardware logic units comprise circuitry in common with at least one other of the first, the second, and the third one or more hardware logic units.

EC65) A tangible non-transitory computer readable medium having a set of instructions stored therein that when executed by a processing element cause the processing element to perform and/or control operations comprising:
generating at least two virtual addresses;
determining respective address modification policies for each of the virtual address via;
in response to the respective address modification policies, modifying each of the virtual addresses to produce respective modified virtual addresses; and
wherein the processing element comprises the address modification policy hardware logic unit.

EC66) The tangible non-transitory computer readable medium of EC65, wherein the generating of a first one of the virtual addresses, the determining of the respective address modification policy for the first virtual address, and the modifying of the first virtual address are in response to a single instruction of the set of instructions.

EC67) A system comprising:
means for generating at least two virtual addresses;
means for determining respective address modification policies for each of the virtual address;
means for, in response to the respective address modification policies, modifying each of the virtual addresses to produce respective modified virtual addresses; and
wherein a first one of the virtual addresses and a first one of the respective modified virtual addresses are produced in response to a single instruction.

EC68) The system of EC67, wherein a first one of the address modification policies is produced in response to the single instruction.

EC69) A method comprising:
requesting an allocation of memory via an API; and
providing the API with one or more parameters indicating one of a plurality of cache eviction policies to use in at least some circumstances when filling one or more cache lines with information from all or any portions of the allocated memory.

EC70) The method of EC69, wherein the one or more parameters are cache eviction policy parameters and further comprising providing the API with one or more address modification parameters indicating one of a plurality of address modification polices to use in at least some circumstances when accessing information from all or any portions of the allocated memory.

EC71) A method comprising:
in response to a request for an allocation of memory via an API, selecting from one or more heaps memory to allocate for the request; and
wherein the selecting is responsive to one or more parameters provided to the API, the parameters indicating one of a plurality of cache eviction policies to use in at least some circumstances when filling one or more cache lines with information from all or any portions of the allocated memory.

EC72) The method of EC71, wherein the one or more parameters are cache eviction policy parameters and the selecting is further responsive to one or more address modification parameters indicating one of a plurality of address modification polices to use in at least some circumstances when accessing information from all or any portions of the allocated memory.

EC73) A method comprising:
requesting an allocation of memory via an API; and
providing the API with one or more parameters indicating one of a plurality of address modification parameters to use in at least some circumstances when accessing information from all or any portions of the allocated memory.

EC74) The method of EC75, wherein the one or more parameters are address modification parameters and further comprising providing the API with one or more cache eviction policy parameters indicating one of a plurality of cache eviction policies to use in at least some circumstances when filling one or more cache lines with information from all or any portions of the allocated memory.

EC75) A method comprising:
in response to a request for an allocation of memory via an API, selecting from one or more heaps memory to allocate for the request; and
wherein the selecting is responsive to one or more parameters provided to the API, the parameters indicating one of a plurality of address modification parameters to use in at least some circumstances when accessing information from all or any portions of the allocated memory.

EC76) The method of EC75, wherein the one or more parameters are address modification parameters and he selecting is further responsive to one or more cache eviction policy parameters indicating one of a plurality of cache eviction policies to use in at least some circumstances when filling one or more cache lines with information from all or any portions of the allocated memory.

EC77) A tangible non-transitory computer readable medium having a set of instructions stored therein that when executed by a processing element cause the processing element to perform and/or control operations comprising:
requesting an allocation of memory via an API; and
providing the API with one or more parameters indicating one of a plurality of cache eviction policies to use in at least some circumstances when filling one or more cache lines with information from all or any portions of the allocated memory.

EC78) The tangible non-transitory computer readable medium of EC77, wherein the one or more parameters are cache eviction policy parameters and the operations further comprise providing the API with one or more address modification parameters indicating one of a plurality of address modification polices to use in at least some circumstances when accessing information from all or any portions of the allocated memory.

EC79) A tangible non-transitory computer readable medium having a set of instructions stored therein that when executed by a processing element cause the processing element to perform and/or control operations comprising:
in response to a request for an allocation of memory via an API, selecting from one or more heaps memory to allocate for the request; and
wherein the selecting is responsive to one or more parameters provided to the API, the parameters indicating one of a plurality of cache eviction policies to use in at least some circumstances when filling one or more cache lines with information from all or any portions of the allocated memory.

EC80) The tangible non-transitory computer readable medium of EC79, wherein the one or more parameters are cache eviction policy parameters and the selecting is further responsive to one or more address modification parameters indicating one of a plurality of address modification polices to use in at least some circumstances when accessing information from all or any portions of the allocated memory.

EC81) A tangible non-transitory computer readable medium having a set of instructions stored therein that when executed by a processing element cause the processing element to perform and/or control operations comprising:
  requesting an allocation of memory via an API; and
  providing the API with one or more parameters indicating one of a plurality of address modification parameters to use in at least some circumstances when accessing information from all or any portions of the allocated memory.

EC82) The tangible non-transitory computer readable medium of EC83, wherein the one or more parameters are address modification parameters and the operations further comprise providing the API with one or more cache eviction policy parameters indicating one of a plurality of cache eviction policies to use in at least some circumstances when filling one or more cache lines with information from all or any portions of the allocated memory.

EC83) A tangible non-transitory computer readable medium having a set of instructions stored therein that when executed by a processing element cause the processing element to perform and/or control operations comprising:
  in response to a request for an allocation of memory via an API, selecting from one or more heaps memory to allocate for the request; and
  wherein the selecting is responsive to one or more parameters provided to the API, the parameters indicating one of a plurality of address modification parameters to use in at least some circumstances when accessing information from all or any portions of the allocated memory.

EC84) The tangible non-transitory computer readable medium of EC83, wherein the one or more parameters are address modification parameters and he selecting is further responsive to one or more cache eviction policy parameters indicating one of a plurality of cache eviction policies to use in at least some circumstances when filling one or more cache lines with information from all or any portions of the allocated memory.

Any of the foregoing ECs having or referring to one or more cache eviction policies, wherein the cache eviction policies comprise any one or more of a random, an LRU, an LFU, a segmented LRU, an MRU, an LIRS, an AR, a CAR, and a FIFO eviction policies.

Any of the foregoing ECs having or referring to a random eviction policy, wherein the random eviction policy is a pseudo-random eviction policy.

Any of the foregoing ECs having or referring to an LRU eviction policy, wherein the LRU eviction policy is one of exact, approximate, and tends to preferentially evict less recently used cache storage sub-units over more recently used cache storage sub-units.

Any of the foregoing ECs having or referring to an LFU eviction policy, wherein the LFU eviction policy is one of exact, approximate, and tends to preferentially evict less frequently used cache storage sub-units over more frequently used cache storage sub-units.

Any of the foregoing ECs having or referring to a FIFO eviction policy, wherein the FIFO eviction policy is one of exact, approximate, and tends to preferentially evict cache storage sub-units allocated earlier over cache storage sub-units allocated later.

Any of the foregoing ECs having or referring to one or more address modification policies, wherein the address modification policies comprise any one or more of no modification, a modification according to two-dimensional Morton ordering, and a modification according to three-dimensional Morton ordering.

Any of the foregoing ECs having or referring to one or more address modification policies, wherein the address modification policies comprise any one or more respective address modifications according to any one or more multi-dimensional Morton orderings, each of the multi-dimensional Morton orderings corresponding respectively to two dimensions, three dimensions, four dimensions, five dimensions, and so forth.

Any of the foregoing ECs having or referring to one or more address modification policies, wherein the address modification policies are in accordance with one or more structure-size indicators, the structure-size indicators specifying a number of elements in one or more dimensions of one or more data structures.

Any of the foregoing ECs having or referring to one or more address modification policies, wherein the address modification policies are in accordance with one or more element-size indicators, the element-size indicators specifying sizes of elements of one or more data structures.

Operating Context and Operation Overview

FIG. 1A illustrates selected details of concepts relating to various operating contexts and embodiments of a memory system that implements a plurality of cache eviction policies and/or a plurality of virtual address modification policies. Conceptually memory is allocated and subsequently referenced. The memory allocation is in accordance with zero or more eviction policies and/or zero or more virtual address modification policies, such as via reservation and/or management of one or more portions of one or more virtual address spaces. The reference of the allocated memory is, e.g., in response to execution of memory instructions. The memory referencing includes generation of a virtual address (unmodified), optional, selective, and/or conditional modification of the virtual address, and generation of a corresponding physical address as a function of the possibly modified virtual address. The generation of the physical address optionally, selectively, and/or conditionally includes a determination of a particular cache line eviction policy to associate with the physical address. Selecting a cache line for eviction (e.g., as part of processing a cache line fill) is optionally, selectively, and/or conditionally a function of the particular cache line eviction policy.

More specifically, a memory allocation function (malloc (EP, 2D/3D, Ssize, . . . ) 110M) is used to allocate memory (Memory Allocate 111M) such as via one or more portions of one or more virtual address spaces being allocated optionally, selectively, and/or conditionally in accordance with zero or more eviction policies and/or zero or more virtual address modification policies. The memory allocation function is provided zero or more optional parameters, such as a (cache) eviction policy specification (e.g. an EP parameter), and/or a virtual address modification policy specification (e.g. a 2D/3D dimension parameter and/or a structure-size (Ssize) parameter). The memory allocation function optionally, selectively, and/or conditionally operates in accordance with zero or more predetermined virtual address ranges and/or zero or more programmable virtual address ranges (e.g. as specified by Modify (Md) Ranges/

Entries 122). In various embodiments, the memory allocation function operates in conjunction with one or more OS functions that populate page table information (e.g. all or any portions of Page Table 130 having a plurality of entries illustrated as PT.Entry 132 and PT.Entry 138) with respective eviction policy specifications PT.EP 133 and PT.EP 139.

The allocated memory is then referenced (Memory Reference (VA) 110R) such as via load and/or store memory operations resulting from execution, of, e.g., memory reference instructions of software. The execution produces an unmodified virtual address (Unmodified VA 111R) that is then processed (Modify 120) to determine whether the unmodified virtual address is to remain unmodified or is to be modified, such as by comparison with zero or more predetermined virtual address ranges and/or zero or more programmable virtual address ranges (e.g. as specified by Modify (Md) Ranges/Entries 122). An optionally modified virtual address results ((Modified) VA 121).

The optionally modified virtual address is then looked up in a cache of virtual to physical translations (e.g. TLB 140, having a plurality of entries illustrated as TLB.Entry 142 and TLB.Entry 148 with respective eviction policy specifications TLB.EP 143 and TLB.EP 149). In response to a hit in the TLB, information from a particular entry of the TLB (e.g. TLB.Entry 142) optionally specifies an eviction policy (e.g. TLB.EP 143) to associate with the optionally modified virtual address. Further, the particular entry of the TLB provides physical address information that when combined with all or any portions of the optionally modified virtual address specifies a (complete) physical address. In response to a miss in the TLB, an entry in the TLB is filled via information from a page table entry (TLB Fill 131), such as via information from a particular entry in the page table (e.g. PT.Entry 132) being used to populate a particular entry in the TLB (e.g. TLB.Entry 142), for example by copying eviction policy information from PT.EP 133 to TLB.EP 143. Processing for the TLB miss then proceeds by performing a TLB look up that will then result in a TLB hit.

The physical address is then used to reference physical memory, such as a cache (e.g. Cache 150 having a plurality of lines illustrated as Line 152 and Line 158 with respective eviction policy specifications Ln.EP 153 and Ln.EP 159). In response to a cache miss for the physical address, then a cache fill is performed (Cache Fill 141). Depending on cache state and operating context, a particular line is selected for eviction (Cache Eviction 151 and Eviction Line Selection 160) in response to the cache fill. In various embodiments and/or usage scenarios, the particular line selected for eviction is optionally, selectively, and/or conditionally and/or selectively based on eviction policy information associated with the physical address (e.g. TLB.EP 143) and/or eviction policy information associated with various lines of the cache (e.g. Ln.EP 153 and Ln.EP 159).

As a specific example, a program executing on a processor requests memory allocation for a specific data set that is larger than a first level data cache of the processor (e.g. via malloc(EP, 2D/3D, Ssize, . . . ) 110M). Because the specific data set is larger than the first level cache and expected to be accessed at least partially sequentially more than once, the memory allocation request specifies a random eviction policy (rather than, e.g., an LRU eviction policy). In response to the memory allocation request, a pointer is provided to a portion of virtual address space that is associated with a random eviction policy, e.g. via one or more page table entries having EP values that specify a random eviction policy (e.g. PT.Entry 132 with PT.EP 133 specifying the random eviction policy). The pages having EP values specifying a random eviction policy are from a pool of such pages or alternatively the pages are "created" in response to the memory allocation request, such as by OS population of one or more new page table entries.

After the memory allocation, the program generates a reference to a portion of the data set via the pointer and optionally an offset (e.g. Memory Reference (VA) 110R). The pointer and an optional offset are combined to form a virtual address (e.g. Unmodified VA 111R) that is checked against address modification policy information (e.g. as managed by Modify 120). As this example has no address modification, an unmodified virtual address is produced (e.g. (Modified) VA 121), that is then looked up in a data TLB of the processor (e.g. TLB 140). The look up is a miss and in response an entry in the data TLB is populated in accordance with at least one of the pages having EP values specifying the random eviction policy. E.g. an entry is made in the TLB, and the entry includes an EP specification specifying the random eviction policy (e.g. TLB Fill 131 via copying PT.EP 133 into TLB.EP 143). The virtual address is then looked up again in the data TLB, resulting in a hit in the data TLB, and producing a physical address and an associated eviction policy (the random eviction policy).

The physical address is looked up in the first level data cache (e.g. Cache 150). The look up is a miss, and in response a cache fill begins (e.g. Cache Fill 141). The cache fill processing begins by selecting a line for eviction from the first level data cache (e.g. Cache Eviction 151 and Eviction Line Selection 160). Since the eviction policy associated with the physical address is the random eviction policy, the line for eviction is chosen randomly (versus, e.g., LRU). The chosen line is evicted and the cache fill completes. In some embodiments, eviction policy information is copied from the TLB into the first level data cache (such as copying TLB.EP 143 copied into an appropriate line in Cache 150, e.g. Ln.EP 153 when Line 152 is the line the cache fill fills).

As another specific example, a program executing on a processor requests memory allocation for a two-dimensional square data set (e.g. via malloc(EP, 2D/3D, Ssize, . . . ) 110M). The program will process the data set according to one or more image processing operations, including some operations that examine nearest neighbors (e.g. adjacent elements) of a particular element in the data set when processing the particular element, such as "compass point" neighbors (north, northeast, east, southeast, south, southwest, west, and northwest). E.g., when processing the northwest corner element of the data set, adjacent elements to the east, southeast, and south of the northwest corner element are referenced. Therefore, the requested memory allocation specifies a two-dimensional Morton ordering address modification policy having a structure-size equal to one dimension of the (square) data set, whereby the northwest corner element as well as the elements immediately to the east, southeast, and south of the northwest corner element, are available in a same cache line and/or a same page, in various embodiments and/or usage scenarios. In response to the memory allocation request, a pointer is provided to a portion of virtual address space that is associated with a two-dimensional Morton ordering having a structure-size equal to the one dimension. E.g. the pointer identifies a virtual address space portion that is prearranged (such as via one or more entries of Modify (Md) Ranges/Entries 122) to be modified appropriately when referenced.

After the memory allocation, the program generates a reference to the northwest corner element of the data set (e.g. an instance of Memory Reference (VA) 110R). The pointer and an optional offset are combined to form a virtual address (e.g. Unmodified VA 111R) that is compared with information describing zero or more virtual address ranges subject to modification (e.g. Modify (Md) Ranges/Entries 122). The comparison determines that the virtual address is to be modified, according to two-dimensional Morton ordering having a structure-size equal to the one dimension, and a modified virtual address results ((e.g. an instance of (Modified) VA 121).

Continuing with the example, the modified virtual address is looked up in a data TLB of the processor (e.g. TLB 140), a miss results, and an entry of the data TLB is populated (e.g. TLB Fill 131). The modified virtual address is then looked up again in the data TLB, resulting in a hit, and producing a physical address (and optionally an associated eviction policy). The physical address is looked up in the first level data cache (e.g. Cache 150), a miss results, and in response a cache fill occurs (e.g. Cache Fill 141). Data for the northwest corner element is returned in response to the cache fill.

Then the program generates a reference to the adjacent element to the south of the northwest corner element (e.g. as another instance of Memory Reference (VA) 110R), producing an (as yet) unmodified virtual address of the south element (e.g. as another instance of Unmodified VA 111R). The virtual address of the south element is then compared (e.g. Modify 120) and determined to be modified, according to the two-dimensional Morton ordering having the structure-size as was applied to the virtual address of the northwest corner element. A modified virtual address of the south element is produced (e.g. another instance of ((Modified) VA 121) and looked up in the data TLB, resulting in a hit that produces a physical address (and optionally an associated eviction policy).

In various embodiments and/or usage scenarios, the TLB hit for the south element is with respect to a same entry as the TLB hit for the northwest corner element. The physical address for the south element is looked up in the first level data cache, and a hit results. In various embodiments and/or usage scenarios, the cache hit for the south element is with respect to a same cache line as the cache fill for the northwest corner element. The program further generates references to the adjacent elements to the southeast and east of the northwest corner element. Each of the references is compared (e.g. via Modify 120) and modified according to the two-dimensional Morton ordering having the structure-size as was applied to the virtual address of the northwest corner element. Respective modified virtual addresses are produced and looked up in the data TLB. In some embodiments and/or usage scenarios, both of the respective modified virtual addresses hit a same entry in the data TLB as was filled for the modified virtual address of the northwest corner element. Further, in some embodiments and/or usage scenarios, both respective physical addresses produced by the data TLB are hits to the same cache line as was filled for the northwest corner element.

In some embodiments and/or usage scenarios, determining a particular eviction policy to associate with a particular physical address is performed via information associated with and/or from one or more page tables (and/or entries thereof), such as directly from the page tables (or entries thereof) and/or by matching one or more cached entries of page table information (such as stored in a TLB), as described above. In other embodiments and/or usage scenarios, determining a particular eviction policy to associate with a particular physical address is performed by comparison with zero or more predetermined virtual address ranges and/or zero or more programmable virtual address ranges (e.g. conceptually similar to Modify (Md) Ranges/Entries 122).

In some embodiments and/or usage scenarios, determining if and/or how to modify a virtual address (e.g. Morton 2D/3D and structure-size) is performed via comparison with zero or more predetermined virtual address ranges and/or zero or more programmable virtual address ranges (e.g. as specified by Modify (Md) Ranges/Entries 122), as described above. In other embodiments and/or usage scenarios, determining if and/or how to modify a virtual address is performed via information associated with and/or from one or more page tables (and/or entries thereof), such as directly from the page tables (or entries thereof) and/or by matching one or more cached entries of page table information (such as stored in a TLB). Thus, in some embodiments and/or usage scenarios, functions performed by Modify 120 are instead performed by Page Table 130 and/or TLB 140, e.g. via a first of two look ups in the TLB. More specifically, a first TLB look up is performed using an unmodified virtual address (e.g. an instance of Unmodified VA 111R). Then a modified virtual address is conditionally produced (e.g. an instance of (Modified) VA 121), and a second TLB look up is performed using the (conditionally modified) virtual address.

In various embodiments, Page Table 130 is variously implemented as a single-level page table, a multiple-level page table, one or more page tables describing pages all of a same size, one or more page tables describing pages of varying sizes, and so forth. In various embodiments, TLB 140 is variously implemented as a single TLB, a plurality of TLBs, one or more instruction TLBs, one or more data TLBs, one or more micro-TLBs, one or more full-size TLBS, one or more TLBs filled wholly or partially by hardware, one or more TLBs filled wholly or partially by software, and so forth. In various embodiments, Cache 150 is implemented as a single cache, a plurality of caches, one or more zero- and/or first-level caches, one or more second- and/or third-level caches, one or more data-only caches, one or more instruction-only caches, one or more combined/unified data and instruction caches, one or more fully or partially associative caches, and so forth.

In some embodiments, the virtual address modification policy specification includes a number of dimensions parameter instead of a 2D/3D dimension parameter. The number of dimensions parameter is two to indicate 2D, three to indicate 3D, four to indicate 4D, five to indicate 5D, and so forth.

Figure 1B:
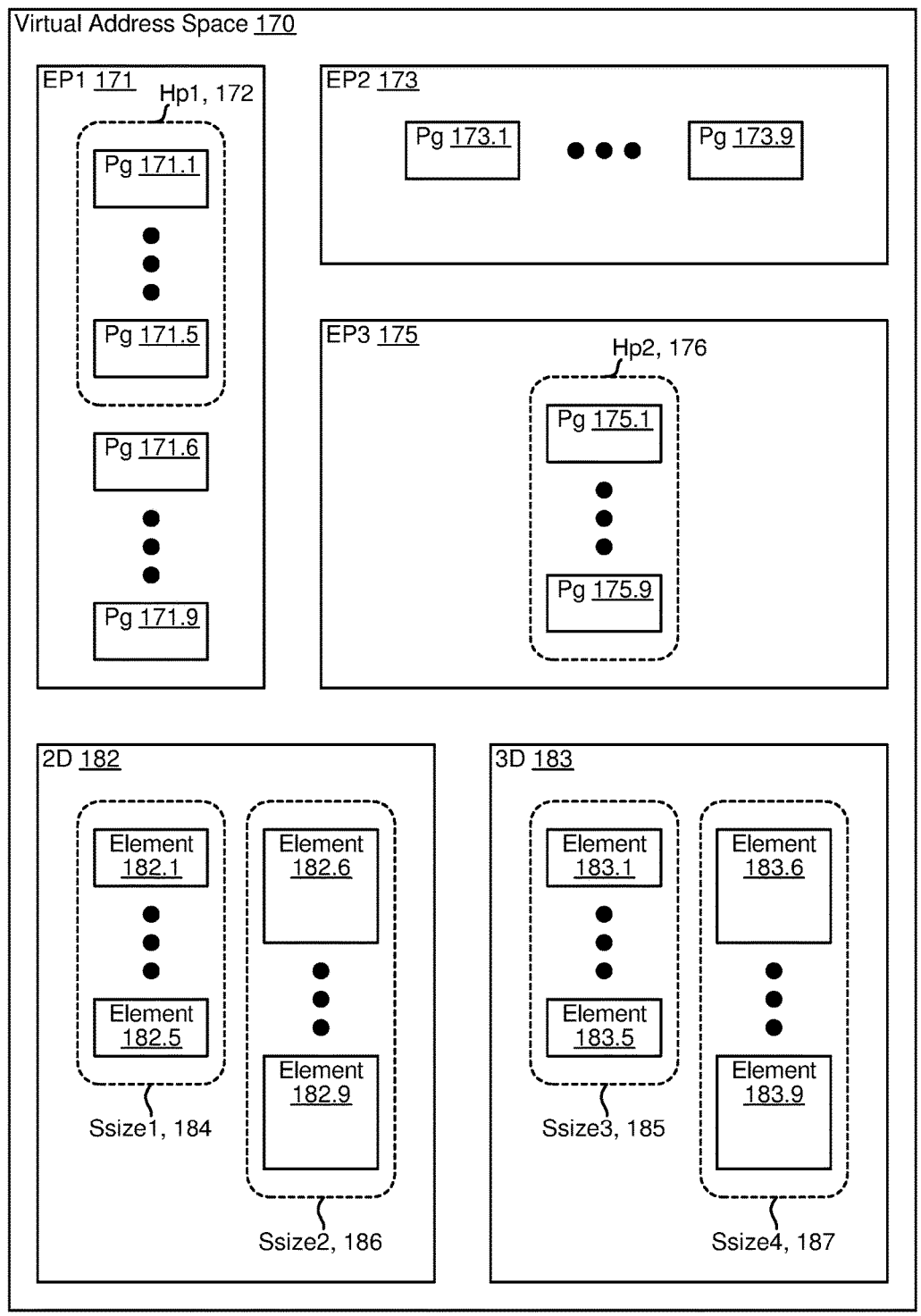
FIG. 1B illustrates selected details of virtual address space usage for various usage scenarios and embodiments of a memory system that implements a plurality of cache eviction policies and/or a plurality of virtual address modification policies.

FIG. 1B illustrates selected details of virtual address space usage for various usage scenarios and embodiments of a memory system that implements a plurality of cache eviction policies and/or a plurality of virtual address modification policies.

An example virtual address space (Virtual Address Space 170) includes one or more portions relating to the cache eviction policies (EP1 171, EP2 173, and EP3 175). Each of the respective portions is for a respective one of the cache eviction policies. For example, EP1 171 is for a first cache eviction policy, such as LRU, and EP information associated with pages therein (Pages (Pg)s 171.1 . . . 171.5 and 171.6 . . . 171.9) indicates LRU as an associated cache eviction policy. Continuing with the example, EP2 173 is for a second cache eviction policy, such as MRU, and EP information associated with pages therein (Pages (Pg)s 173.1 . . . 173.9) indicates MRU as an associated cache eviction policy. Continuing with the example, EP3 175 is for a third cache eviction policy, such as random, and EP information associated with pages therein (Pages (Pg)s 175.1 . . . 175.9) indicates random as an associated cache eviction policy.

In some embodiments and/or usage scenarios, respective heaps are managed so that all pages of each respective heap have a same respective cache eviction policy, thus enabling allocation of memory (via, e.g., a memory allocation function such as malloc(EP, 2D/3D, Ssize, . . . ) 110M of FIG. 1A) from the heaps in accordance with a requested cache eviction policy. Continuing with the example, all pages of Heap 1 (Hp1) 172 have a same cache eviction policy, LRU, and all pages of Heap 2 (Hp2) 176 have a same cache eviction policy, random.

In response to a memory allocation request for memory associated with an LRU cache eviction policy (e.g. via an instance of malloc(EP, 2D/3D, Ssize, . . . ) 110M of FIG. 1A with the EP parameter indicating 'LRU'), pages from Heap 1 (Hp1) 172 are returned (e.g. any one or more of Pages (Pg)s 171.1 . . . 171.5 and/or a pointer thereto). In response to a memory allocation request for memory associated with a random cache eviction policy (e.g. via an instance of malloc(EP, 2D/3D, Ssize, . . . ) 110M of FIG. 1A with the EP parameter indicating 'random'), pages from Heap 2 (Hp2) 176 are returned (e.g. any one or more of Pages (Pg)s 175.1 . . . 175.9 and/or a pointer thereto).

In the foregoing description, determining a particular eviction policy to associate with a particular physical address is performed in association with pages (e.g. as described by information from Page Table 130 and or cached in TLB 140 of FIG. 1A). In some alternate embodiments and/or usage scenarios, determining a particular eviction policy to associate with a particular physical address is performed by comparison with zero or more predetermined virtual address ranges and/or zero or more programmable virtual address ranges (e.g. conceptually similar to Modify (Md) Ranges/Entries 122 of FIG. 1A). In some of the alternate embodiments and/or usage scenarios, the portions relating to the cache eviction policies (e.g. EP1 171, EP2 173, and EP3 175) are described via predetermined and/or programmable virtual address ranges. For instance, starting and ending virtual addresses of EP1 171 are predetermined, and starting and ending virtual addresses of EP2 173 and EP3 175 are programmed into one or more processor control registers.

In the foregoing description, number and arrangement of the portions (e.g. EP1 171, EP2 173, and EP3 175) are representative of any number and arrangement of portions. For instance, some usage scenarios have two portions each having respective distinct cache eviction policies, while other usage scenarios have three or four portions each having respective distinct cache eviction policies. Further note that in the foregoing description, number and arrangement of heaps and pages are representative of any number and arrangement of heaps and pages. For instance, some usage scenarios have two heaps (as illustrated by Heap 1 (Hp1) 172 and Heap 2 (Hp2) 176) dedicated to two respective distinct cache eviction policies, and other usage scenarios have three or four heaps each dedicated to respective distinct cache eviction policies. Pages (Pg)s 171.1 . . . 171.5 are representative of any number of pages, as are Pages (Pg)s 171.6 . . . 171.9, Pages (Pg)s 173.1 . . . 173.9, and Pages (Pg)s 175.1 . . . 175.9.

The example virtual address space further includes one or more portions for virtual address modification policies, such as according to Morton ordering for two or three dimensions and various respective structure-sizes. A portion for two-dimensional Morton ordering (2D 182) includes a first sub-portion for a first structure-size (Ssize1 184) having therein a plurality of elements (Elements 182.1 . . . 182.5 representative of any number of elements), and a second sub-portion for a second structure-size (Ssize2 186) having therein a plurality of elements (Elements 182.6 . . . 182.9 representative of any number of elements). A portion for three-dimensional Morton ordering (3D 183) includes a first portion for a third structure-size (Ssize3 185) having therein a plurality of elements (Elements 183.1 . . . 183.5 representative of any number of elements), and a second sub-portion for a fourth structure-size (Ssize4 187) having therein a plurality of elements (Elements 183.6 . . . 183.9 representative of any number of elements).

In response to a memory allocation request for memory associated with a two-dimensional Morton ordering modification policy of a first particular structure-size, such as 4096 (e.g. via an instance of malloc(EP, 2D/3D, Ssize, . . . ) 110M of FIG. 1A with the 2D/3D parameter indicating '2D' and the structure-size parameter indicating '4096'), elements from Ssize1 184 are returned (e.g. $4096^2$ elements of Elements 182.1 . . . 182.5 and/or a pointer thereto). In response to a memory allocation request for memory associated with a two-dimensional Morton ordering modification policy of a second particular structure-size, such as 8192 (e.g. via an instance of malloc(EP, 2D/3D, Ssize, . . . ) 110M of FIG. 1A with the 2D/3D parameter indicating '2D' and the structure-size parameter indicating '8192'), elements from Ssize2 186 are returned (e.g. $8192^2$ elements of Elements 182.6 . . . 182.9 and/or a pointer thereto).

In response to a memory allocation request for memory associated with a three-dimensional Morton ordering modification policy of a first particular structure-size, such as 16384 (e.g. via an instance of malloc(EP, 2D/3D, Ssize, . . . ) 110M of FIG. 1A with the 2D/3D parameter indicating '3D' and the structure-size parameter indicating '16384'), elements from Ssize3 185 are returned (e.g. $16384^3$ elements of Elements 183.1 . . . 183.5 and/or a pointer thereto). In response to a memory allocation request for memory associated with a three-dimensional Morton ordering modification policy of a second particular structure-size, such as 32768 (e.g. via an instance of malloc(EP, 2D/3D, Ssize, . . . ) 110M of FIG. 1A with the 2D/3D parameter indicating '3D' and the structure-size parameter indicating '32768'), elements from Ssize4 187 are returned (e.g. $32768^3$ elements of Elements 183.6 . . . 183.9 and/or a pointer thereto).

In response to a memory allocation request for memory with an address modification policy of no modification, elements and/or pointers thereto are returned for portions other than 2D 182 and 3D 183, such as portions of EP1 171, EP2 173, and/or EP3 175.

In the foregoing description, determining an address modification policy to associate with a particular physical address is performed by comparison with zero or more predetermined virtual address ranges and/or zero or more programmable virtual address ranges (e.g. Modify (Md) Ranges/Entries 122 of FIG. 1A). In some alternate embodiments and/or usage scenarios, determining a particular address modification policy to associate with a particular physical address is performed in association with pages (e.g. as described by information from Page Table 130 and or cached in TLB 140 of FIG. 1A).

In the foregoing description, number and arrangement of the portions (e.g. 2D 182 and 3D 183) as well as sub-portions thereof (e.g. Ssize1 184, Ssize2 186, Ssize3 185, and Ssize4 187) are representative of any number and arrangement of portions and/or sub-portions. For instance, some usage scenarios have sub-portions corresponding to a plurality of data structures of a same number of dimensions (e.g. 2D or 3D), and varying numbers of elements (e.g. $1024^2$, $1024^3$, $2048^2$, $2048^3$, and so forth). For another instance, some usage scenarios have sub-portions corresponding to a plurality of data structures of a same number of dimensions as well as a same number of elements (e.g. a first sub-portion for a first $8192^2$ data structure, a second sub-portion for a second $8192^2$ data structure, and so forth).

In some embodiments and/or usage scenarios, various cache eviction policies are combined with various address modification policies. In the context of the figure, the combining of cache and address modification policies corresponds conceptually to the portions of Virtual Address Space 170 relating to cache eviction policies (EP1 171, EP2 173, and EP3 175) being orthogonal to the portions relating to address modification policies (2D 182 and 3D 183). Thus, all or any amounts of the cache eviction policy portions "overlap" with all or any amounts of the address modification policy portions of the virtual address space. For instance, one or more virtual address ranges are set aside (e.g. via predetermined, programmed, and/or page table mechanisms) for an LRU cache eviction policy in combination with a two-dimensional Morton ordering address modification policy of a particular structure-size. For another instance, one or more virtual addresses ranges are set aside for a random cache eviction policy in combination with a three-dimensional Morton ordering address modification policy of another particular structure-size.

Eviction Line Selection

Figure 2A:
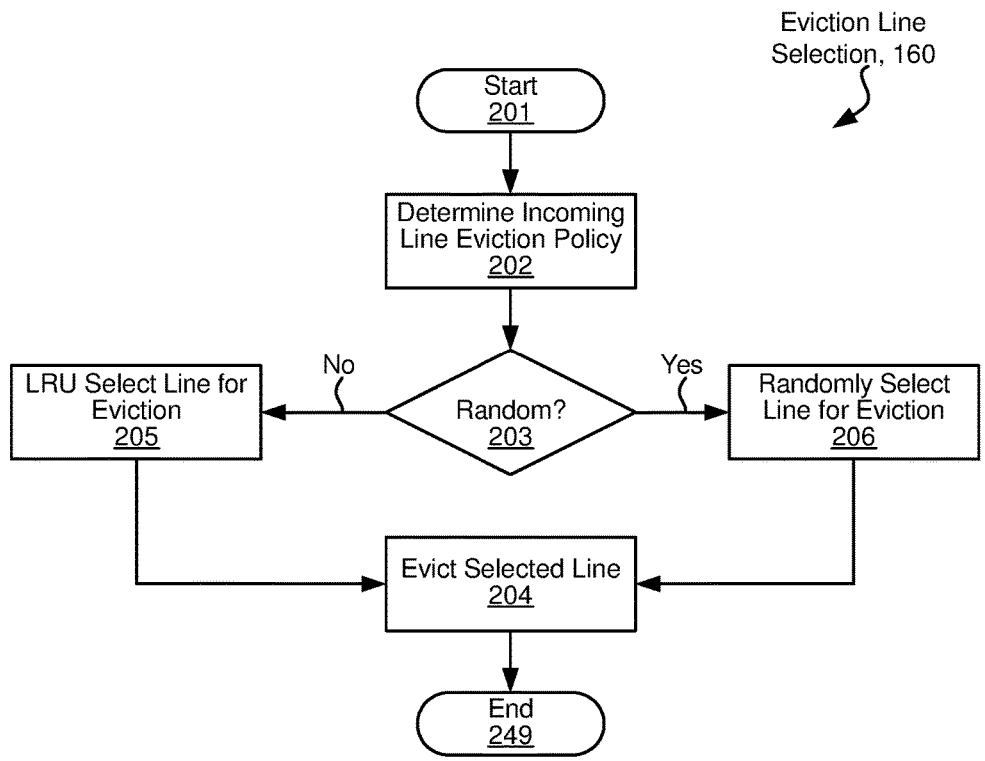
FIG. 2A illustrates selected details of various embodiments of memory system eviction line selection, according to a plurality of cache eviction policies.

FIG. 2A illustrates selected details of various embodiments of memory system eviction line selection (e.g. Eviction Line Selection 160 of FIG. 1A), according to a plurality of cache eviction policies. Processing begins (Start 201) in response to a cache eviction that is in response to a cache fill. A cache eviction policy of the line being filled into the cache is ascertained (Determine Incoming Line Eviction Policy 202). In some embodiments, the line eviction policy is determined by examining information obtained during production of a physical address of the line being filled into the cache, such as via eviction policy information from a page table entry (e.g. PT.EP 133 of FIG. 1A) and/or eviction policy information cached in a TLB entry (e.g. TLB.EP 143 with respect to Cache Fill 141, both of FIG. 1A). In some embodiments, the line eviction policy is determined by comparison with zero or more predetermined virtual address ranges and/or zero or more programmable virtual address ranges.

In response to the incoming line eviction policy being random (Random? 203), a line for eviction is randomly selected (Randomly Select Line for Eviction 206). In response to the incoming line eviction policy being other than random, a line for eviction is selected via some other mechanism, such as LRU (LRU Select Line for Eviction 205). Subsequent to selecting the line for eviction (via Randomly Select Line for Eviction 206 or LRU Select Line for Eviction 205), the selected line is evicted (Evict Selected Line 204), and processing is complete (End 249).

The foregoing description is in accordance with embodiments having two specific cache eviction policies, e.g., random and LRU. Other embodiments have more and/or different cache eviction policies, such as any one or more of random, LRU, LFU, segmented LRU, MRU, LIRS, AR, CAR, and FIFO eviction policies. For example, an embodiment having LRU, MRU, and random cache eviction policies determines the incoming line eviction policy as one of LRU, MRU, and random, and then selects a line for eviction in accordance with the determined incoming line eviction policy as LRU, MRU, and random, respectively.

In various embodiments and/or usage scenarios, selection of a line for eviction is from a pool of lines including all eligible lines. For example, with a four-way set associative cache, random selection of a line for eviction (e.g. as associated with Randomly Select Line for Eviction 206) randomly chooses from among any of the four sets. For another example, with an eight-way set associative cache, LRU selection of a line for eviction (e.g. as associated with LRU Select Line for Eviction 205) is with respect to all of the eight ways. In other various embodiments and/or usage scenarios, selection of a line for eviction is from a pool that is a subset of all eligible lines. For example, with a 16-way set associative cache, random selection of a line for eviction is limited to lines having an associated cache eviction policy of random (e.g. as identified by Ln.EP 153 and Ln.EP 159 of FIG. 1A indicating random).

Figure 2B:
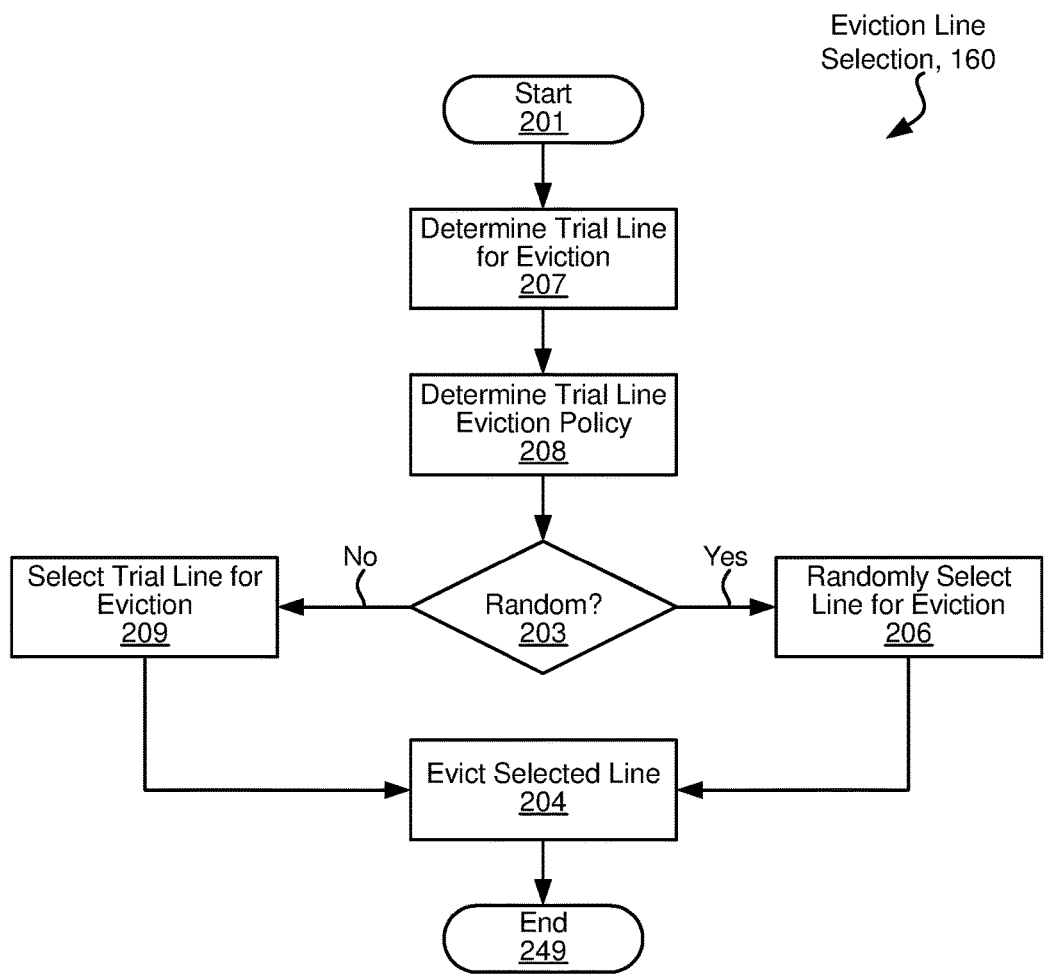
FIG. 2B illustrates selected details of various embodiments of memory system eviction line selection, according to a plurality of cache eviction policies.

FIG. 2B illustrates selected details of various embodiments of memory system eviction line selection (e.g. Eviction Line Selection 160 of FIG. 1A), according to a plurality of cache eviction policies. Elements having identifiers equal to elements of FIG. 2A operate as in FIG. 2A, and are not specifically discussed here. A candidate line is tentatively selected for eviction (Determine Trial Line for Eviction 207) based on a predetermined and/or programmatically determined cache eviction policy (e.g. as one of random, LRU, LFU, segmented LRU, MRU, LIRS, AR, CAR, and FIFO eviction policies). Then the cache eviction policy of the candidate line is determined (Determine Trial Line Eviction Policy 208), such as via eviction policy information from a page table entry and/or eviction policy information cached in a TLB entry corresponding to the candidate line. In some embodiments, the candidate line eviction policy is determined by comparison with zero or more predetermined virtual address ranges and/or zero or more programmable virtual address ranges. In some embodiments, the candidate line eviction policy is determined from eviction policy information specifically associated with the candidate line (e.g. Ln.EP 159 of FIG. 1A). In response to the candidate line eviction policy being other than random, the candidate line is selected for eviction (Select Trial Line for Eviction 209).

Virtual Address Modification

Figure 2C:
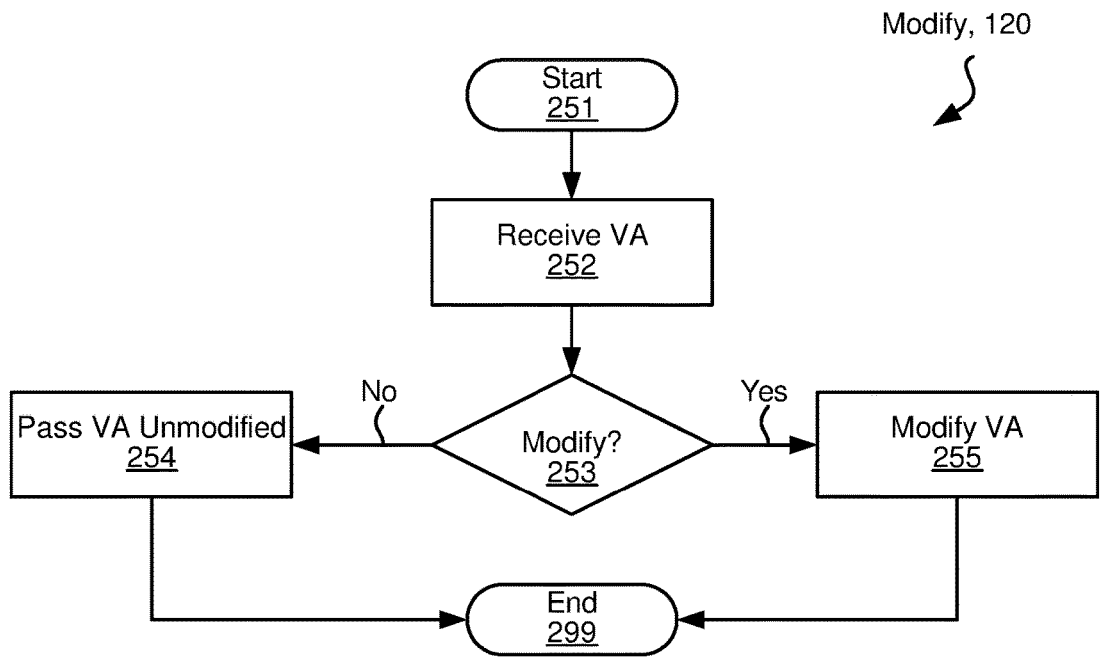
FIG. 2C illustrates selected details of various embodiments of virtual address modification, according to a plurality of address modification policies.

FIG. 2C illustrates selected details of various embodiments of virtual address modification (e.g. Modify 120 of FIG. 1A), according to a plurality of address modification policies. Processing begins (Start 251) in response to a virtual address (e.g. Unmodified VA 111R of FIG. 1A) generated as a result of, for example, load and/or store memory operations resulting from execution, of, e.g., memory reference instructions of software. The (unmodified) virtual address is received (Receive VA 252) and then checked to determine whether the virtual address is to be modified (Modify? 253). In response to a determination that the virtual address is to be modified, the virtual address is modified (Modify VA 255). In response to a determination that the virtual address is not to be modified, the virtual address is passed unmodified (Pass VA Unmodified 254). The selectively modified virtual address is produced as a result (e.g. (Modified) VA 121 of FIG. 1A). Processing is then complete (End 299).

In various embodiments and usage scenarios, the determination that the virtual address is to be modified or not is via comparison with zero or more predetermined virtual address ranges and/or zero or more programmable virtual address ranges (e.g. as specified by Modify (Md) Ranges/

Entries 122 of FIG. 1A). In alternate various embodiments and/or usage scenarios, the determination of if and/or how the virtual address is to be modified is via information associated with and/or from one or more page tables (and/or entries thereof), such as directly from the page tables (or entries thereof) and/or by matching one or more cached entries of page table information (such as stored in a TLB).

Figure 3:
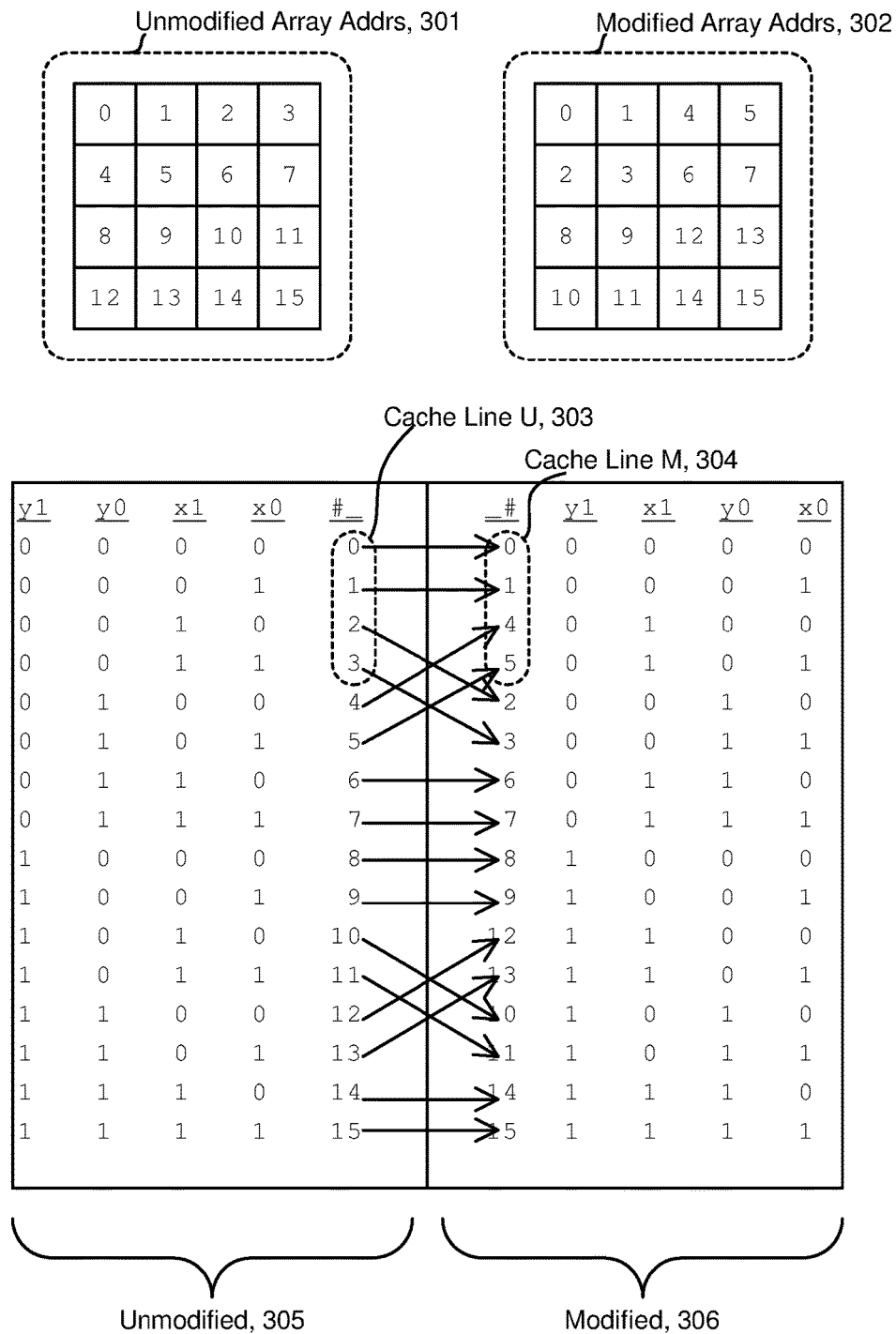
FIG. 3 illustrates selected details of embodiments implementing unmodified and respective modified virtual addresses.

FIG. 3 illustrates selected details of embodiments implementing unmodified and respective modified virtual addresses. Generally, operation with an address modification policy of no modification is illustrated in the left portion of the figure (Unmodified 305), and operation with an address modification policy of one example modification is illustrated in the right portion of the figure (Modified 306). Alternatively, Unmodified 305 illustrates virtual addresses as generated before modification, and Modified 306 illustrates corresponding virtual addresses after modification. In some embodiments, virtual addresses as described in relation to the figure are offsets, such as with respect to a base address of an allocated portion of memory.

In some embodiments, a virtual address modification policy (such as corresponding to Morton ordering) is implemented by dilating and interleaving. Consider the two-dimensional square data set with four elements in each dimension, as illustrated in the figure. Rows are addressed, e.g., by a two-bit row index, x having $x_1$ as a most significant digit and $x_0$ as a least signification digit (as described elsewhere herein, alternative notation for $x_1$ and $x_0$ is $x<1>$ and $x<0>$, respectively). Similarly, columns are addressed by a two-bit row index, y, having $y_1$ and $y_0$ as respective most and least significant digits (as described elsewhere herein, alternative notation for $y_1$ and $y_0$ is $y<1>$ and $y<0>$, respectively). An unmodified virtual address is generated by concatenation of the column index and the row index, e.g. $y\|x$ or alternatively $y_1\|y_0\|x_1\|x_0$, (e.g. as illustrated by Unmodified 305). A modified virtual address is generated (from the unmodified virtual address) by dilating the respective column and row indices, as, e.g. $y_1\| \ldots \|y_0\| \ldots$ and $\ldots \|x_1\| \ldots \|x_0$) and then interleaving results of the dilating the column and row dilations, as, e.g. $y_1\|x_1\|y_0\|x_0$ (e.g. as illustrated by Modified 306).

The figure illustrates a two-dimensional square data set, having four elements in each dimension, depicted in accordance with virtual addresses generated, e.g., by execution of a program, such as an image processing program, as Unmodified Array Addresses 301. Thus, during execution of the image processing program, the program generates virtual address 0 to refer to the northwest corner of the data set. The program further generates virtual addresses 4, 5, and 1, respectively, to refer to respective adjacent elements to the south, southeast, and east of the northwest corner element. One embodiment of a virtual address modification policy is depicted as Modified Array Addresses 302, corresponding to Morton ordering for two-dimensions with a structure-size of four elements.

The foregoing embodiment is with respect to a virtual address modification policy for a two-dimensional square data set having four elements in each direction. Some embodiments have virtual address modification policies for three (or more) dimensions. Some embodiments have virtual address modification policies for rectangular rather than and/or in addition to square data sets. Some embodiments have virtual address modification policies for various elements in each dimension, e.g. 1024, 2048, 4096, 8192, 16384, and so forth. Some embodiments provide for a number of elements in each dimension to be a power of two (e.g. 2, 4, 8, 16, 32 . . . 16384, and so forth). Some embodiments provide for a number of elements in each dimension to be other-than a power of two (e.g. 7, 13, 100, and so forth), and virtual address modification policies operate as if the number of elements in each dimension were "rounded up" to a next power of two (e.g. 8, 16, 128, and so forth, respectively). E.g. a seven by seven array is treated as an eight by eight array for address modification, and elements in the eight row and eight column are unused. Some embodiments concurrently provide a plurality of virtual address modification policies, such as for two- and three-dimensions and various structure-sizes, such as 1024, 2048, and so forth, as determined, e.g., by corresponding zero or more predetermined virtual address ranges and/or zero or more programmable virtual address ranges (e.g. as specified by Modify (Md) Ranges/Entries 122) of FIG. 1A).

In some embodiments and/or usage scenarios, operating with a virtual address modification policy of no modification fills a cache line with a row of elements of the data set, in response to a cache miss when referencing the northwest corner of the data set (e.g., as illustrated by Cache Line U 303). A subsequent reference to the adjacent element south of the northwest corner (virtual address 4) results in another cache miss. In some embodiments and/or usage scenarios, operating with a virtual address policy of Morton ordering for two-dimensions with a structure-size of four elements fills a cache line with two partial rows of elements of the data set, in response to a cache miss when referencing the northwest corner of the data set (e.g. as illustrated by Cache Line M 304). A subsequent reference to the adjacent element south of the northwest corner (virtual address 4) results in a cache hit (as do references to other adjacent elements southeast and east of the northwest corner element). Thus, in some operating contexts, a virtual address policy of a particular modification, e.g. Morton ordering, results in accesses to adjacent elements with reduced cache misses.

In some embodiments and/or usage scenarios, such as when a row of a (square) data set occupies one page and the data set is aligned on a page boundary, operating with a virtual address modification policy of no modification populates pages with one row of the data set per page. A reference to the northwest corner of the data set followed by a referenced to the adjacent element south of the northwest corner results in references to two pages. In some embodiments and/or usage scenarios, operating with a virtual address policy of Morton ordering for two-dimensions with a structure-size equal to a page, populates a single page with information from two (or more) rows of the data set. A reference to the northwest corner of the data set followed by a reference to the adjacent element south of the northwest corner results in references to the single page. Thus, in some operating contexts, a virtual address policy of a particular modification, e.g. Morton ordering, results in accesses to adjacent elements with reduced page-related management overhead.

Computer System

Figure 4:
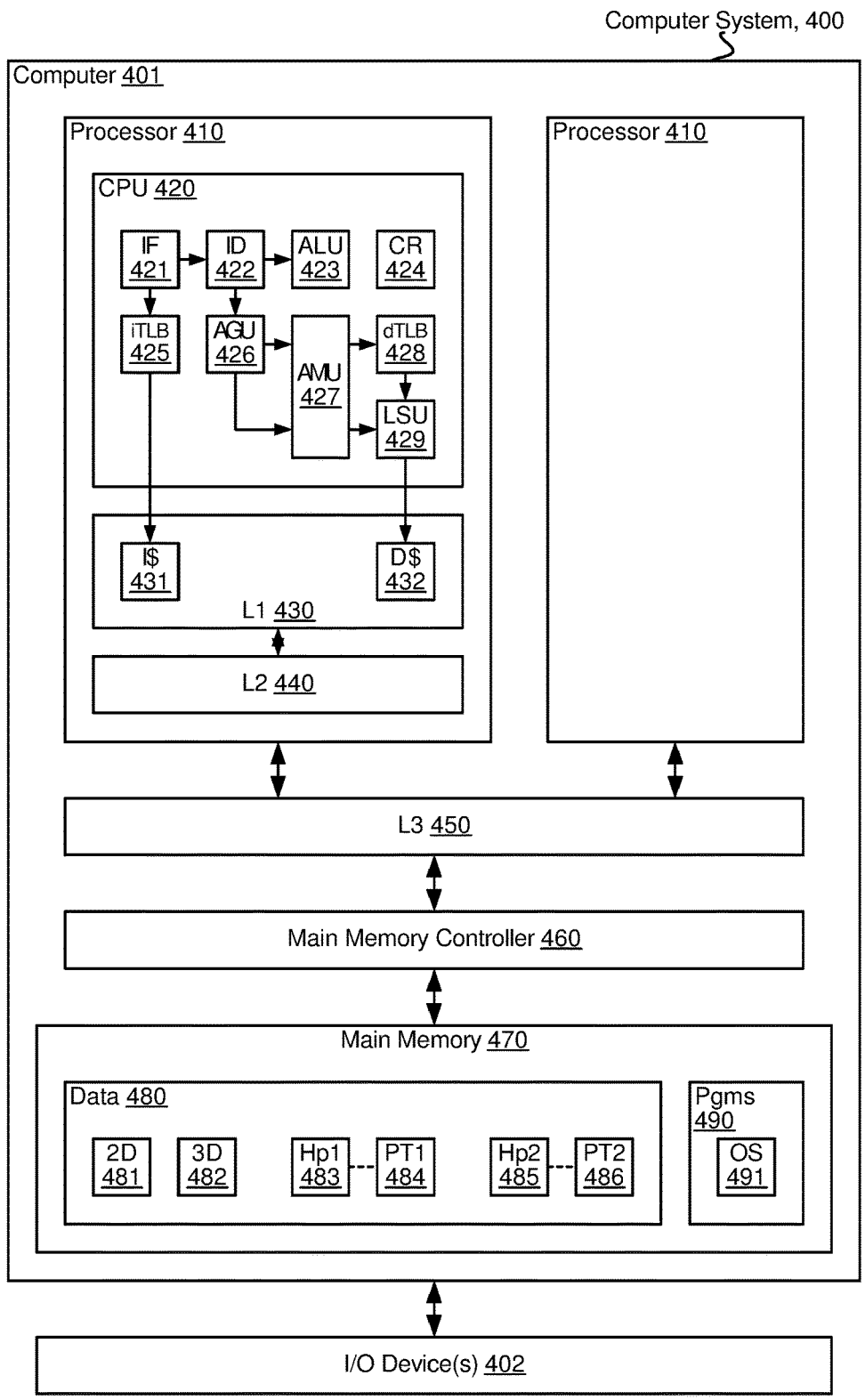
FIG. 4 illustrates selected details of embodiments of a computer system implementing a plurality of cache eviction policies and a plurality of virtual address modification policies.

FIG. 4 illustrates selected details of embodiments of Computer System 400 implementing a plurality of cache eviction policies and a plurality of virtual address modification policies. The Computer System includes Computer 401 coupled to I/O Device(s) 402. The Computer includes one or more processor elements, represented conceptually by two illustrated instances of Processor 410. The Processors are coupled to L3 450, operating as a shared outer-level cache. L3 450 is coupled to Main Memory 470 via Main Memory Controller 460. Each instance of Processor 410 includes a variety of elements (for simplicity of illustration, only one instance is illustrated in detail).

The Processors includes CPU 420 coupled to L1 430 (operating as an innermost-level cache) that is in turn coupled to L2 440. The CPU includes an instruction fetch module, IF 421, feeding an instruction decode module, ID 422. IF 421 communicates instruction fetch requests based on virtual addresses to iTLB 425 that in turn communicates the instruction fetch requests as physical addresses to I$ 431 (an element of L1 430). In various embodiments and/or usage scenarios, all or any portions of iTLB 425 and/or I$ 431 implement all or any portions of operations and/or functions relating to the plurality of cache eviction policies. ID 422 communicates operations to perform for execution of decoded instructions to ALU 423 and AGU 426. ALU 423 performs various arithmetic and logical operations, using operands from and providing results to, one or more processor registers, such as general purpose registers (not illustrated). AGU 426 performs address calculation and/or arithmetic (e.g. using operands from the general purpose registers and/or machine state associated with address calculation such as segment registers), producing virtual addresses that are provided to AMU 427.

AMU 427 optionally, selectively, and/or conditionally modifies the virtual addresses, in accordance with the plurality of virtual address modification policies. AMU 427 communicates the possibly respective modified virtual addresses to dTLB 428 and LSU 429. In some embodiments, more significant bits of the possibly respective modified virtual addresses are communicated to dTLB 428, and less significant bits are communicated to LSU 429. dTLB 428 determines physical addresses based at least in part on all or any portions of the possibly modified virtual addresses, and communicates information relating to the physical addresses to LSU 429. LSU 429, using physical address information from AMU 427 and/or dTLB 428, performs cache accesses via communication with D$ 432 (an element of L1 430). In various embodiments and/or usage scenarios, all or any portions of dTLB 428 and/or D$ 432 (as well as all or any portions of iTLB 425 and/or I$ 431) implement all or any portions of operations and/or functions relating to the plurality of cache eviction policies.

Not specifically illustrated in the figure are, for example, various control elements and connections thereto, as well as some data communication pathways. The number and arrangement of elements in CPU 420 vary according to embodiment. For example, some embodiments include registers and/or execution resources relating to floating point operations and/or single-instruction multiple-data operations. For another example, some embodiments have a plurality of any one or more ALU, AGU, and AMU elements.

In various embodiments, programmable resources that specify virtual address modification policies, such as ranges of virtual addresses to modify, and types of modifications to perform (e.g. two- or three-dimensions and particular structure-sizes) are implemented wholly or partially via CR 424. For example, all or any portions of Modify (Md) Ranges/Entries 122 of FIG. 1A are included in CR 424. In various alternate embodiments, the programmable resources are implemented wholly or partially via AMU 427 and/or various combinations of portions of CR 424 and AMU 427.

Various portions of Main Memory 470 provide storage for Data 480 and Programs 490. Various portions of Data 480 provide storage for 2D 481 and 3D 482, as well as Heap 1 (Hp1) 483/PT1 484 and Heap 2 (Hp2) 485/PT2 486. Various portions of Programs 490 provide storage for OS 491. All or any portions of executables stored in Programs 490 (e.g. BIOS, driver, OS 491, hypervisor, and application software such as implementing one or more image processing operations) are fetched and executed by one or more instances of Processor 410. In various embodiments and/or usage scenarios, all or any portions of 2D 481 and 2D 482 correspond respectively to all or any portions of physical storage respectively referenced via 2D 182 and 3D 183 of FIG. 1B.

PT1 484 includes page table entries describing pages of Heap 1 (Hp1) 483, and similarly PT2 486 includes page table entries describing pages of Heap 2 (Hp2) 485. In various embodiments and/or usage scenarios, all or any portions of Heap 1 (Hp1) 483 correspond to all or any portions of physical storage referenced via Heap 1 (Hp1) 172 of FIG. 1B. All or any portions of PT1 484 correspond to all or any portions of physical storage holding page table information describing pages of Heap 1 (Hp1) 172 (e.g. Pages (Pg)s 171.1 . . . 171.5), such as referred to via all or any elements of Page Table 130 (e.g. PT.Entry 132 and PT.Entry 138) of FIG. 1A. In various embodiments and/or usage scenarios, all or any portions of Heap 2 (Hp2) 485 correspond to all or any portions of physical storage referenced via Heap 2 (Hp2) 176 of FIG. 1B. All or any portions of PT2 486 correspond to all or any portions of physical storage holding page table information describing pages of Heap 2 (Hp2) 176 (e.g. Pages (Pg)s 175.1 . . . 175.9), such as referred to via all or any elements of Page Table 130 (e.g. PT.Entry 132 and PT.Entry 138) of FIG. 1A.

In various embodiments and/or usage scenarios, OS 491 implements functions relating to management of memory allocation and page tables, e.g. in accordance with malloc (EP, 2D/3D, Ssize, . . . ) 110M and Page Table 130 of FIG. 1A and all or any portions of Virtual Address Space 170 of FIG. 1B. In various embodiments and/or usage scenarios, all or any portions of software of Programs 490 executed by instances of CPU 420 result in one or more instances of Memory Reference (VA) 110R of FIG. 1A.

In various embodiments and/or usage scenarios, all or any portions of iTLB 425 and/or dTLB 428 correspond to all or any portions of TLB 140 of FIG. 1A. In various embodiments and/or usage scenarios, all or any portions of L1 430 (e.g. I$ 431 and/or D$ 432), L2 440, and L3 450, correspond to all or any portions of Cache 150 of FIG. 1A, and/or implement all or any portions of operations performed as described with respect to elements of FIG. 2A and/or FIG. 2B. In various embodiments and/or usage scenarios, all or any portions of AMU 427 implement all or any operations as described with respect to elements of FIG. 2C, e.g. Modify VA 255.

In various embodiments and/or usage scenarios, all or any portions of Computer System 400 are implemented as one or more logic and/or circuit hardware modules, such as one or more integrated circuits and/or portions thereof.

Figure 5A:
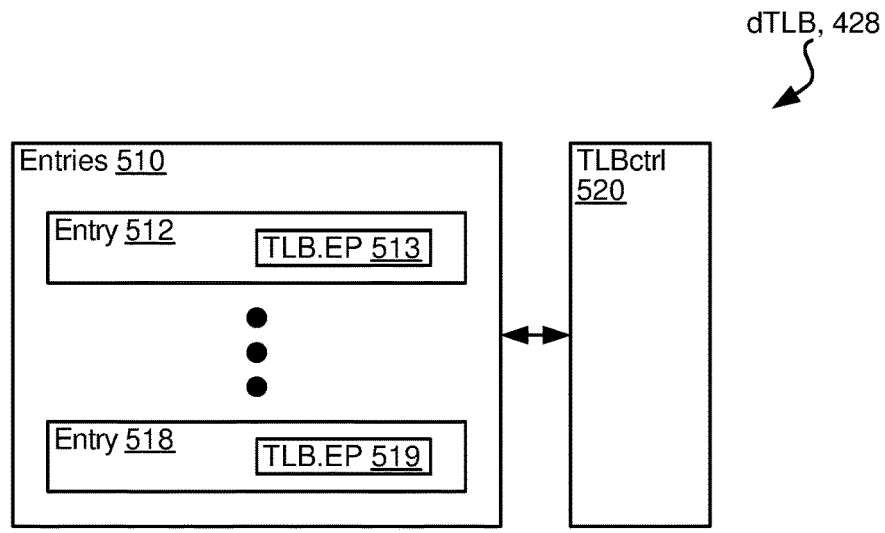
FIG. 5A illustrates selected details of embodiments of a TLB in accordance with a plurality of cache eviction policies and/or a plurality of virtual address modification policies.

FIG. 5A illustrates selected details of embodiments of dTLB 428 that are in accordance with a plurality of cache eviction policies and/or a plurality of virtual address modification policies. The dTLB includes a plurality of entries (Entries 510) and a control module (TLB Control (TLBctrl) 520). Each of the entries (e.g. Entry 512 . . . Entry 518) includes respective storage (e.g. TLB.EP 513 . . . TLB.EP 519) describing and/or specifying a particular cache eviction policy to associate with the respective entry. In various embodiments and/or usage scenarios, Entry 512 and Entry 518 correspond to entries of TLB 140 of FIG. 1A (e.g. TLB.Entry 142 and TLB.Entry 148), and TLB.EP 513 and TLB.EP 519 correspond to TLB.EP 143 and TLB.EP 149. In various embodiments and/or usage scenarios, TLB Control (TLBctrl) 520 implements all or any portions of operations for filling TLB entries, e.g. corresponding to TLB Fill 131 of FIG. 1A. In various embodiments and/or usage scenarios, all or any portions of iTLB 425 of FIG. 4 are implemented with structure identical to or similar to that of dTLB 428 as illustrated by FIG. 5A.

In various embodiments and/or usage scenarios, EP information is omitted from TLB entries (e.g. elements such as TLB.EP 513 . . . TLB.EP 519 are not present), and instead EP information from one or more alternate sources is used. Example alternate sources include EP information associated with zero or more predetermined virtual address ranges and/or zero or more programmable virtual address ranges.

Figure 5B:
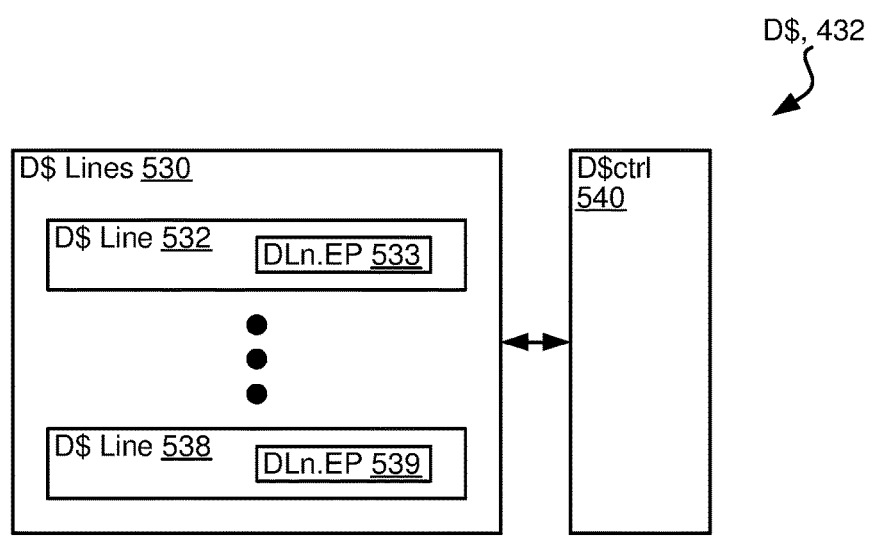
FIG. 5B illustrates selected details of embodiments of a data cache in accordance with a plurality of cache eviction policies.

FIG. 5B illustrates selected details of embodiments of D$ 432 that are in accordance with a plurality of cache eviction policies. The D$ includes a plurality of lines (D$ Lines 530) and a control module (D$ Control (D$ctrl) 540). Each of the lines (e.g. D$ Line 532 . . . D$ Line 538) includes respective storage (e.g. D$ Line EP (DLn.EP) 533 . . . D$ Line EP (DLn.EP) 539) describing and/or specifying a particular cache eviction policy to associate with the respective line. In various embodiments and/or usage scenarios, D$ Line 532 and D$ Line 538 correspond to lines of Cache 150 of FIG. 1A (e.g. 152 and Line 158), and D$ Line EP (DLn.EP) 533 and D$ Line EP (DLn.EP) 539 correspond to Ln.EP 153 and Ln.EP 159. In various embodiments and/or usage scenarios, D$ Control (D$ctrl) 540 implements all or any portions of operations for evicting and/or filling cache lines, e.g. corresponding to Cache Fill 141 and/or Cache Eviction 151 of FIG. 1A. In various embodiments and/or usage scenarios, D$ Control (D$ctrl) 540 implements all or any portions of operations performed as described with respect to elements of FIG. 2A and/or FIG. 2B. In various embodiments and/or usage scenarios, all or any portions of I$ 431, L2 440, and L3 450 of FIG. 4 are implemented with structure identical or similar to that of D$ 432 as illustrated by FIG. 5A.

In various embodiments and/or usage scenarios, EP information is omitted from cache lines (e.g. elements such as DLn.EP) 533 . . . D$ Line EP (DLn.EP) 539 are not present), and instead EP information from one or more alternate sources is used. Example alternate sources include EP information associated with zero or more predetermined virtual address ranges and/or zero or more programmable virtual address ranges. Further example alternate sources include EP information associated with and/or from one or more page tables (and/or entries thereof), such as directly from the page tables (or entries thereof) and/or by matching one or more cached entries of page table information (such as stored in a TLB, e.g. TLB.EP 513 . . . TLB.EP 519).

Figure 6:
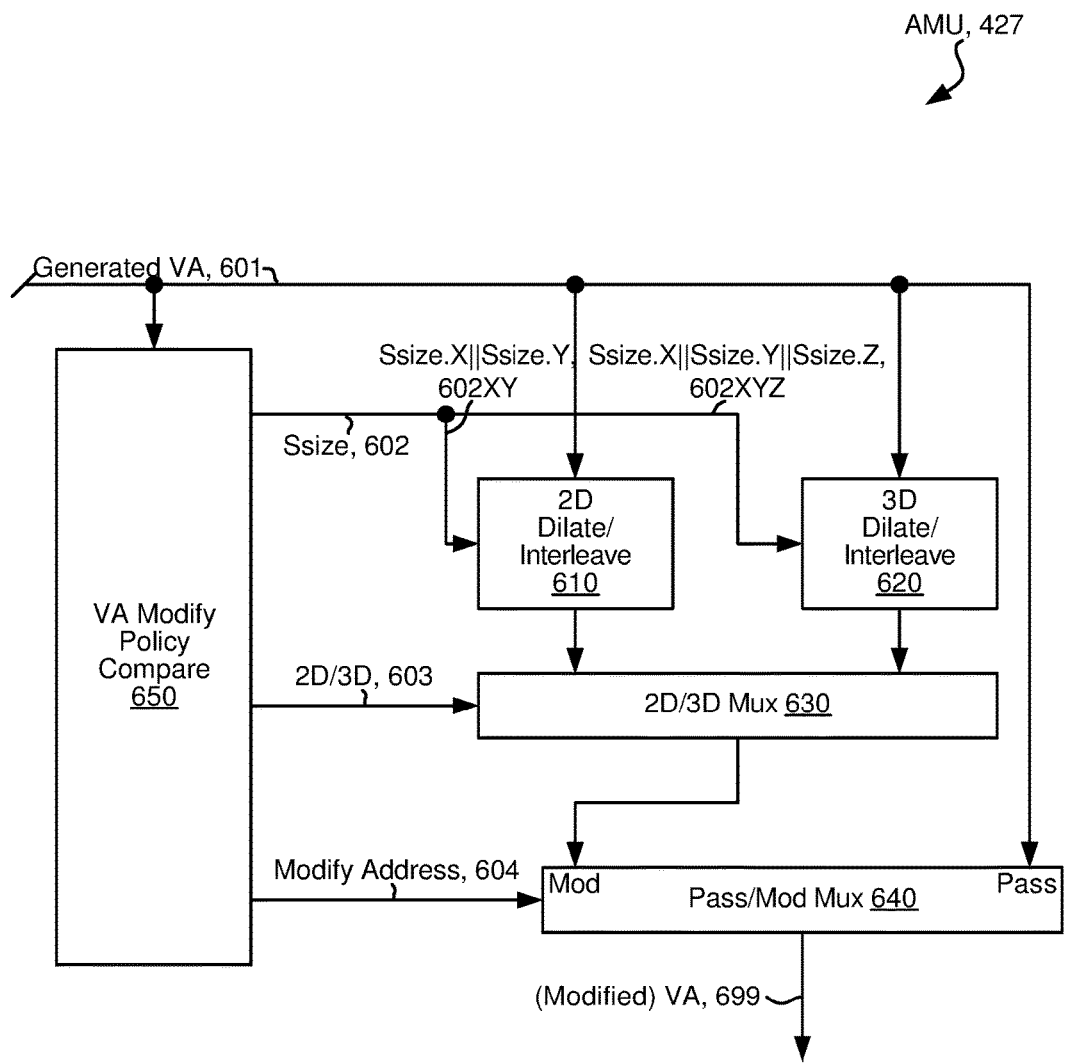
FIG. 6 illustrates selected details of embodiments of an address modification unit for conditionally modifying virtual addresses.

FIG. 6 illustrates selected details of embodiments of AMU 427 for conditionally modifying virtual addresses. VA Modify Policy Compare 650 is coupled to 2D Dilate/Interleave 610, 3D Dilate/Interleave 620, 2D/3D Mux 630, and Pass/Modify Mux 640. 2D Dilate/Interleave 610 and 3D Dilate/Interleave 620 are coupled to 2D/3D Mux 630. 2D/3D Mux 630 is coupled to Pass/Modify Mux 640.

In operation, VA Modify Policy Compare 650 receives a generated virtual address (Generated VA 601), and compares the virtual address with zero or more predetermined virtual address ranges and/or zero or more programmatically determined virtual address ranges to determine if and/or how to modify the virtual address. If the virtual address is to remain unmodified, then VA Modify Policy Compare 650 indicates so via Modify Address 604, and in response, Pass/Modify Mux 640 passes Generated VA 601 through to (Modified) VA 699 without modification. If the virtual address is to be modified, then VA Modify Policy Compare 650 indicates so via Modify Address 604, and the result of 2D/3D Mux 630 is passed to (Modified) VA 699 in accordance with the modification. Further, if the virtual address is to be modified, VA Modify Policy Compare 650 indicates appropriate dimensional information for the modification (e.g. 2D or 3D) via 2D/3D 603 to 2D/3D Mux 630, and appropriate structure-size information (e.g. number of data elements per dimension) via Ssize 602 to 2D Dilate/Interleave 610 and/or 3D Dilate/Interleave 620. 2D Dilate/Interleave 610 and 3D Dilate/Interleave 620 perform appropriate dilating and interleaving of Generated VA 601 according to Ssize 602.

Examples of operation of AMU 427 are as follows. Predetermined and/or programmed information in VA Modify Policy Compare 650 identifies virtual addresses from 0 to $(2^{32})-1$ as having a virtual address modification policy specification of no modification, virtual addresses from $2^{32}$ to $(2^{48})-1$ as having a virtual address modification policy specification of 2D and a structure-size of 1024 elements per dimension, and virtual addresses from $2^{48}$ to $(2^{64})-1$ as having a virtual address modification policy specification of 3D and a structure-size of 4096 elements per dimension.

As a first example operation, a virtual address of $2^{16}$ is provided via Generated VA 601. VA Modify Policy Compare 650 compares $2^{16}$ to the aforementioned virtual address ranges and determines that $2^{16}$ is subject to a virtual address modification policy of no modification. VA Modify Policy Compare 650 indicates no modification via Modify Address 604 and Pass/Modify Mux 640 passes $2^{16}$ unmodified from Generated VA 601 to (Modified) VA 699.

As a second example operation, a virtual address of $2^{34}$ is provided via Generated VA 601. VA Modify Policy Compare 650 compares $2^{34}$ to the aforementioned virtual address ranges and determines that $2^{34}$ is subject to a virtual address modification policy of 2D and a structure-size of 1024 elements per dimension. VA Modify Policy Compare 650 indicates a structure-size of 1024 elements per dimension via Ssize 602 (e.g. as two fields Ssize.X||Ssize.Y 602XY), and a dimension as 2D via 2D/3D 603. In response, 2D Dilate/Interleave 610 performs a 2D dilating and interleaving according to the structure-size of 1024 elements per dimension. Specifically, the least significant 10 bits (log base 2 of 1024) of 601 are dilated and interleaved with the next more significant 10 bits of 601, and the remaining more significant bits of 601 are passed unchanged.

In the following description of dilating and interleaving, notation is used of an integer enclosed in angle brackets to denote a specific bit number, e.g. <0> refers to a least significant bit, e.g. bit zero, <1> refers to a next more significant bit, e.g. bit one, and so forth to <63> referring to a most significant bit, e.g. bit 63. Further, two integers separated by a colon denote a range of bits, e.g. <1:0> refers to two least significant bits, e.g. bits one and zero adjacent to each other. Thus the least significant 10 bits of 601 are denoted as 601<9:0>, and the next more significant 10 bits of 601 are denoted as 601<19:10>, and the remaining more significant bits of 601 are denoted as 601<63:20), assuming 601 is 64 bits.

The dilating and interleaving are performed as follows. In response to the dimension being 2D and the structure-size being 1024, two least significant 10-bit portions of 601 are respectively dilated as 601<19>, one-bit gap, 601<18>, one-bit gap . . . one-bit gap, 601<10>, and one-bit gap; and one-bit gap, 601<9>, one-bit gap, 601<8>, one-bit gap . . . one-bit gap, and 601<0>. Then the dilated portions are interleaved as 601<19>, 601<9>, 601<18>, 601<8> . . . 601<11>, 601<1>, 601<10>, and 601<0>.

As 2D/3D 603 indicates 2D, 2D/3D Mux 630 selects 2D Dilate/Interleave 610 to provide to Pass/Modify Mux 640, and as Modify Address 604 indicates modify, Pass/Modify Mux 640 provides the output of 2D/3D Mux 630 as (Modified) VA 699. Therefore (Modified) VA 699 is set equal to 601<63:20>, 601<19>, 601<9>, 601<18>, 601<8> . . . 601<11>, 601<1>, 601<10>, and 601<0>.

As a third example operation, a virtual address of 2^50 is provided via Generated VA 601. VA Modify Policy Compare 650 compares 2^50 to the aforementioned virtual address ranges and determines that 2^50 is subject to a virtual address modification policy of 3D and a structure-size of 4096 elements per dimension. VA Modify Policy Compare 650 indicates a structure-size of 4096 elements per dimension via Ssize 602 (e.g. as three fields Ssize.X∥Ssize.Y∥Ssize.Z 602XYZ), and a dimension as 3D via 2D/3D 603. In response, 3D Dilate/Interleave 620 performs a 3D dilating and interleaving according to the structure-size of 4096 elements per dimension. Specifically, the least significant 12 bits (log base 2 of 4096) of 601 (601<11:0>) are dilated and interleaved with the next more significant 12 bits of 601 (601<23:12>), as well as the next more significant 12 bits of 601 (601<35:24>), and the remaining more significant bits of 601 (601<63:36>) are passed unchanged.

The dilating and interleaving are performed as follows. In response to the dimension being 3D and the structure-size being 4096, three least-significant 12-bit portions of 601 are respectively dilated as 601<35>, two-bit gap, 601<34>, two-bit gap . . . 601<24>, and two-bit gap; one-bit gap, 601<23>, two-bit gap, 601<22>, two-bit gap . . . 601<12>, and one-bit gap; and two-bit gap, 601<11>, two-bit gap, 601<10>, two-bit gap . . . two-bit gap, and 601<0>. Then the dilated portions are interleaved as 601<35>, 601<23>, 601<11>, 601<34>, 601<22>, 601<10> . . . 601<25>, 601<13>, 601<1>, 601<24>, 601<12>, and 601<0>.

As 2D/3D 603 indicates 3D, 2D/3D Mux 630 selects 3D Dilate/Interleave 620 to provide to Pass/Modify Mux 640, and as Modify Address 604 indicates modify, Pass/Modify Mux 640 provides the output of 2D/3D Mux 630 as (Modified) VA 699. Therefore (Modified) VA 699 is set equal to 601<63:36>, 601<35>, 601<23>, 601<11>, 601<34>, 601<22>, 601<10> . . . 601<25>, 601<13>, 601<1>, 601<24>, 601<12>, and 601<0>.

In various embodiments and/or usage scenarios (such as some operating contexts identical or similar to FIG. 4), AMU 427 receives a virtual address and/or provides an optionally, selectively, and/or conditionally modified virtual address in respective more and less significant bit portions. For instance, AGU 426 provides less significant bits of a generated virtual address to AMU 427 one or more processor clock cycles earlier than corresponding more significant bits of the generated virtual address are provided. For another instance, AMU 427 provides less significant bits of an optionally, selectively, and/or conditionally modified virtual address to LSU 429 one or more processor clock cycles earlier than corresponding more significant bits of the possibly modified virtual address are provided to dTLB 428.

In various embodiments (not illustrated), dimensions higher than three are implemented, e.g., four dimensions and so forth. For each dimension higher than three, additional inputs to a multiplexor (e.g. similar to 2D/3D Mux 630) accommodate appropriate respective dilate/interleave results (e.g. as produced by units similar to 2D Dilate/Interleave 610 and 3D Dilate/Interleave 620, providing for further dilation and interleaving).

In various embodiments, all or any portions of all or any elements illustrated in FIG. 6 are implemented via hardware, such as using logic circuitry.

Various embodiments, having varying partitioning and arrangement of modules compared to FIG. 6, are contemplated. For example, any or all portions of 2D Dilate/Interleave 610 and/or 3D Dilate/Interleave 620 are combined with any or all portions of 2D/3D Mux 630. For another example, 2D Dilate/Interleave 610 and 3D Dilate/Interleave 620 are combined in a single module.

In various embodiments and/or usage scenarios, all or any portions of VA Modify Policy Compare 650 are implemented wholly or partially by all or any portions of CR 424 of FIG. 4. In various embodiments and/or usage scenarios, Unmodified VA 111R and (Modified) VA 121 of FIG. 1A, correspond respectively to Generated VA 601 and (Modified) VA 699.

The foregoing descriptions of virtual address modification polices (e.g. Morton ordering such as illustrated and discussed with respect to FIG. 3), as well as usage and implementations thereof (e.g. malloc(EP, 2D/3D, Ssize, . . . ) 110M of FIG. 1A, and AMU 427 such as illustrated and discussed with respect to FIG. 6), are in accordance with embodiments having elements of unitary element-size with respect to a minimum size addressable memory portion as performed by instruction fetch and/or execution of memory references of instructions. For a first example in accordance with the foregoing description, memory load and/or store instructions provide a minimum size addressable memory portion of one byte operable with cache(s) and main memory that are byte-addressable. For a second example in accordance with the foregoing description, memory load and/or store instructions provide a minimum size addressable memory portion of a 'word' (e.g. a two-byte word) operable with cache(s) and main memory that are word (e.g. two-byte)-addressable.

Other embodiments have elements of non-unitary element-size instead of and/or in addition to elements of unitary size with respect to a minimum size addressable memory portion as performed by instruction fetch and/or execution of memory references of instructions. For a first example, memory load and/or store instructions enable memory references of a minimum size addressable memory portion of one byte as well as another size addressable memory portion of two bytes. E.g. memory load and/or store instructions are provided that address memory as single byte operands or alternatively as two-byte operands. For another example, memory load and/or store instructions enable memory references of a minimum size addressable memory portion of one byte, as well as a plurality of other sizes of addressable memory portions. E.g. memory load and/or store instructions are provided that address memory as single byte operands, two-byte operands, four-byte operands, eight-byte operands, 16-byte operands, 32-byte operands, and so forth.

In various embodiments, a memory allocation function includes one or more element-size (Esize) parameters (e.g. malloc(EP, 2D/3D, Ssize, Esize, . . . ) otherwise similar to malloc(EP, 2D/3D, Ssize, . . . ) 110M of FIG. 1A). For example, an embodiment having elements of a plurality of element-sizes enables specifying one of the plurality of element-sizes via an element-size parameter of a memory allocation function (e.g. the element-size parameter is one to indicate one-byte elements, two to indicate two-byte elements, and so forth). In various embodiments having a plurality of element-sizes, respective heaps are managed in accordance with each of the element-sizes, enabling allocation from among the respective heaps in accordance with an element-size parameter. For example, the element-sizes include one-byte and two-byte element-sizes, heaps include a heap managed in accordance with one-byte elements (e.g.

aligned to a one-byte boundary and grown/shrunk in one-byte increments), and a heap managed in accordance with two-byte elements (e.g. aligned to a two-byte boundary and grown/shrunk in two-byte increments). Continuing with the example, when memory is allocated (e.g. via a memory allocation function such as a form of malloc), the allocation is in accordance with an element-size parameter provided via the memory allocation function. E.g., an element-size parameter of one results in allocation from the heap managed in accordance with one-byte elements and an element-size parameter of two results in allocation from the heap managed in accordance with two-byte elements.

In various embodiments, a memory allocation element-size parameter of a memory allocation function is managed and/or used similarly to other parameters of the memory allocation function (such as similarly to an EP parameter, a 2D/3D dimension parameter, and/or a structure-size parameter). For example, one or more virtual address space portions are used to indicate modification according to respective element-size parameter values, conceptually similar to 2D 182 and 3D 183 of FIG. 1B being used to indicate modification respectively according to two dimensions and three dimensions.

For another example, VA modification policy comparison hardware, conceptually similar to VA Modify Policy Compare 650 of FIG. 6, is enabled to provide one or more outputs indicating element-size for a generated virtual address. The outputs are usable by dilating/interleaving hardware enabled to perform dilating/interleaving according to element-size as well as structure-size, conceptually similar to 2D Dilate/Interleave 610 and 3D Dilate/Interleave 620 of FIG. 6, to modify the generated virtual address according to the indicated element-size (in addition to modification according to the indicated structure-size). An exemplary embodiment of (element-size-enabled) dilating/interleaving hardware enabled to perform dilating/interleaving according to element-size as well as structure-size operates identically to 2D Dilate/Interleave 610 and 3D Dilate/Interleave 620 when element-size is one. For instance, a modified virtual address is formulated from a generated virtual address by interleaving/dilating the least significant portion of the generated address according to structure-size and dimension information.

The element-size-enabled dilating/interleaving hardware operates similarly to 2D Dilate/Interleave 610 and 3D Dilate/Interleave 620 when element-size is non-unity. However, conceptually the dilating/interleaving is performed for more significant bits while leaving one or more least significant bits unchanged (or alternatively set to zero), such as by treating a generated address as having two portions. The first of the two portions is a least significant portion being the least N significant bit(s), where N is the log to the base two of the element-size. The second of the two portions is a most significant portion being the remaining (more significant) bits of the generated virtual address. In some embodiments, a modified virtual address is formulated in two portions from a generated virtual address having a least significant portion and a most significant portion as described foregoing. The first of the two modified virtual address portions is a least significant portion formulated as identical to corresponding bits of the least significant portion of the generated virtual address. The second of the two modified virtual address portions is a most significant portion formulated as a dilating/interleaving of corresponding bits of the most significant portion of the generated virtual address. The dilating/interleaving operates identically to 2D Dilate/Interleave 610 and 3D Dilate/Interleave 620, but based on the most significant bits of the generated virtual address, rather than the entire generated address (as in the context of FIG. 6).

For a first specific instance, when element-size is two, the least significant portion of a 64-bit generated virtual address is the (single) least significant bit (e.g. bits<0>), and the most significant portion of the 64-bit generated virtual address is the remaining 63 more significant bits (e.g. bits<63:1>). A modified virtual address is formulated with the (single) least significant bit equal to the (single) least significant bit of the generated virtual address, and the (63) most significant bits of the modified virtual address are formulated according to dilating/interleaving of the most significant portion of the generated virtual address.

For a second specific instance, when element-size is eight, the least significant portion of a 64-bit generated virtual address is the (three) least significant bits (e.g. bits<2:0>), and the most significant portion of the 64-bit generated virtual address is the remaining 61 more significant bits (e.g. bits<63:3>). A modified virtual address is formulated with the (three) least significant bits equal to the (three) least significant bits of the generated virtual address, and the (61) most significant bits of the modified virtual address are formulated according to dilating/interleaving of the most significant portion of the generated virtual address.

As described elsewhere herein, a specific operating example of virtual address modification is a dimension of 3D, a structure-size of 4096, and an (implied) element-size of one. The modified virtual address as produced from bits of the generated virtual address is described as (Modified) VA 699 is set equal to 601<63:36>, 601<35>, 601<23>, 601<11>, 601<34>, 601<22>, 601<10> . . . 601<25>, 601<13>, 601<1>, 601<24>, 601<12>, and 601<0>. A corresponding exemplary modified virtual address formulation with an element-size of two would be described as (Modified) VA 699 is set equal to 601<63:37>, 601<36>, 601<24>, 601<12>, 601<35>, 601<23>, 601<11> . . . 601<26>, 601<14>, 601<2>, 601<25>, 601<13>, 601<1>, and 601<0>. A corresponding exemplary modified virtual address formulation with an element-size of eight would be described as 601<63:39>, 601<38>, 601<26>, 601<14>, 601<37>, 601<25>, 601<13> . . . 601<28>, 601<16>, 601<4>, 601<27>, 601<15>, 601<3>, and 601<2:0>.

In some embodiments, respective heaps are managed and used for memory allocation in accordance with any one or more of an EP parameter, a 2D/3D and/or dimension parameter (e.g. indicating one of 2D, 3D, 4D, 5D, and so forth), a structure-size parameter, and/or an element-size parameter. For example, there are three values implemented for an EP parameter, two values implemented for a dimension parameter, four values for a structure-size parameter, and four values for an element-size parameter. Continuing with the example, there are 3*2*4*4=96 respective heaps, the multipliers corresponding respectively to the number of values for the EP, dimension, structure-size, and element-size parameters.

In various embodiments, one or more memory allocation functions (such as one or more instances of malloc(EP, 2D/3D, Ssize, . . . ) 110M of FIG. 1A and/or adaptations thereof) are available via one or more APIs. For example, one or more APIs make available to various software elements one or more memory allocation functions that enable specifying any one or more parameters relating to memory allocation. The various software elements include any one or more of BIOS, driver, OS, hypervisor, and application software elements. The parameters relating to memory allocation include zero or more eviction policy parameters, such as the eviction policy (e.g. EP) parameter of malloc(EP, 2D/3D, Ssize, . . . ) 110M. The parameters relating to memory allocation further include zero or more virtual address modification policy parameters, such as the dimension (e.g. 2D/3D or higher dimension) parameter, the structure-size (e.g. Ssize) parameter of malloc(EP, 2D/3D, Ssize, . . . ) 110M, and/or an element-size (e.g. Esize) parameter of a memory allocation function implementing various element-size specifications, such as malloc(EP, 2D/3D, Ssize, Esize, . . . ).

Example Implementation Techniques

In some embodiments, various combinations of all or any portions of operations performed for and or structure associated with a memory system that implements a plurality of cache eviction policies and/or a plurality of virtual address modification policies (optionally made available entirely or partially to various software elements via one or more APIs) as well as portions of a processor, microprocessor, system-on-a-chip, application-specific-integrated-circuit, hardware accelerator, or other circuitry providing all or portions of the aforementioned operations, are specified by a specification compatible with processing by a computer system. The specification is in accordance with various descriptions, such as hardware description languages, circuit descriptions, netlist descriptions, mask descriptions, or layout descriptions. Example descriptions include: Verilog, VHDL, SPICE, SPICE variants such as PSpice, IBIS, LEF, DEF, GDS-II, OASIS, or other descriptions. In various embodiments, the processing includes any combination of interpretation, compilation, simulation, and synthesis to produce, to verify, or to specify logic and/or circuitry suitable for inclusion on one or more integrated circuits. Each integrated circuit, according to various embodiments, is compatible with design and/or manufacture according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacture of integrated circuits.

In some embodiments, various combinations of all or portions of operations as described by a computer readable medium having a set of instructions stored therein, are performed by execution and/or interpretation of one or more program instructions, by interpretation and/or compiling of one or more source and/or script language statements, or by execution of binary instructions produced by compiling, translating, and/or interpreting information expressed in programming and/or scripting language statements. The statements are compatible with any standard programming or scripting language (such as C, C++, Fortran, Pascal, Ada, Java, VBscript, and Shell). One or more of the program instructions, the language statements, or the binary instructions, are optionally stored on one or more computer readable storage medium elements. In various embodiments, some, all, or various portions of the program instructions are realized as one or more functions, routines, sub-routines, in-line routines, procedures, macros, or portions thereof.

CONCLUSION

Certain choices have been made in the description merely for convenience in preparing the text and drawings, and unless there is an indication to the contrary, the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

Various forms of the words "include" and "comprise" are specifically intended to be construed as abstractions describing logical sets of open-ended scope and are not meant to convey physical containment unless described explicitly (such as followed by the word "within").

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as file types; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, operations, functions, routines, sub-routines, in-line routines, procedures, macros, or portions thereof. It is also understood that many functional aspects of embodiments are realizable selectively in either hardware (e.g., generally dedicated circuitry) or software (e.g., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A method comprising:
    determining, from a plurality of eviction policies, a particular eviction policy associated with information to be retained in a cache;
    selecting, from a plurality of lines of the cache, a particular one of the lines to evict from the cache based at least in part on the particular eviction policy, the cache being an N-way cache, and the particular line being from any of the N-ways of the N-way cache, the selecting comprising ascertaining an eviction policy for a trial line of the cache, and when the trial line eviction policy is random, randomly selecting one of the lines of the cache as the particular line and otherwise selecting the trial line as the particular line;
    copying an indicator of the particular eviction policy into the particular line;
    wherein the determining is based at least in part on an address associated with the information; and
    wherein the particular line is simultaneously subject to eviction in accordance with the particular eviction policy as well as at least one other eviction policy of the plurality of eviction policies.

2. The method of claim 1, further comprising generating, via a processor comprising the cache, the address as a virtual address.

3. The method of claim 2, further comprising the processor executing a single instruction, the executing comprising the generating, the determining, and the selecting.

4. The method of claim 2, further comprising the processor fetching a contiguous group of one or more instructions, the fetching comprising the generating, the determining, and the selecting.

5. The method of claim 2, wherein the particular eviction policy is a random eviction policy.

6. The method of claim 5, wherein the random eviction policy is a pseudo-random eviction policy.

7. The method of claim 5, wherein the at least one other eviction policy is a Least-Recently Used (LRU) eviction policy.

8. The method of claim 7, wherein the LRU eviction policy is one of
    exact,
    approximate, and
    preferential, tending to preferentially evict less recently used items from the cache over more recently used items from the cache.

9. The method of claim 2, wherein the determining comprises accessing at least one entry of at least one page table.

10. The method of claim 2, wherein the determining comprises accessing at least one entry of a Translation Look-aside Buffer (TLB) of the processor.

11. The method of claim 2, wherein the determining comprises comparing the virtual address to one or more programmable registers of the processor, the programmable registers indicating one or more address ranges.

12. The method of claim 2, wherein the virtual address is one of at least two virtual addresses, and further comprising:
    determining respective address modification policies for each of the at least two virtual addresses via an address modification policy hardware logic unit of the processor; and
    in response to the respective address modification policies, modifying each of the at least two virtual addresses to produce respective modified virtual addresses.

13. An apparatus comprising:
    first one or more hardware logic units enabled to determine, from a plurality of eviction policies, a particular eviction policy associated with information to be retained in a cache;
    second one or more hardware logic units enabled to select, from a plurality of lines of the cache, a particular one of the lines to evict from the cache based at least in part on the particular eviction policy, the cache being an N-way cache, and the particular line being from any of the N-ways of the N-way cache, the selecting comprising ascertaining an eviction policy for a trial line of the cache, and when the trial line eviction policy is random, randomly selecting one of the lines of the cache as the particular line and otherwise selecting the trial line as the particular line;
    third one or more hardware logic units enabled to copy an indicator of the particular eviction policy into the particular line;
    wherein the determination is based at least in part on an address associated with the information; and
    wherein the particular line is simultaneously subject to eviction in accordance with the particular eviction policy as well as at least one other eviction policy of the plurality of eviction policies.

14. The apparatus of claim 13, wherein the first one or more hardware logic units comprise all or any portions of one or more programmable registers of a processor comprising the cache and the first and the second one or more hardware logic units.

15. The apparatus of claim 13, wherein the first one or more hardware logic units comprise all or any portions of a Translation Look-aside Buffer (TLB) of a processor comprising the cache and the first and the second one or more hardware logic units.

16. The apparatus of claim 13, wherein the second one or more hardware logic units comprise all or any portions of a cache controller of the cache, and a processor comprises the cache and the first and the second one or more hardware logic units.

17. The apparatus of claim 13, wherein a processor comprising the cache is enabled to generate the address as a virtual address.

18. The apparatus of claim 17, wherein the processor is further enabled to direct the first one or more hardware logic units to determine the particular eviction policy and to direct the second one or more hardware logic units to select the particular line in response to processing of a single instruction.

19. The apparatus of claim 17, wherein the processor is further enabled to direct the first one or more hardware logic units to determine the particular eviction policy and to direct the second one or more hardware logic units to select the particular line in response to fetching a contiguous group of one or more instructions.

20. The apparatus of claim 17, wherein the particular eviction policy is a random eviction policy.

21. The apparatus of claim 20, wherein the random eviction policy is a pseudo-random eviction policy.

22. The apparatus of claim 20, wherein the at least one other eviction policy is a Least-Recently Used (LRU) eviction policy.

23. The apparatus of claim 22, wherein the LRU eviction policy is one of
exact,
approximate, and
preferential, tending to preferentially evict less recently used items from the cache over more recently used items from the cache.

24. The apparatus of claim 17, wherein the first one or more hardware logic units are further enabled to access at least one entry of at least one page table to obtain an indicator of the particular eviction policy.

25. The apparatus of claim 17, wherein the first one or more hardware logic units are further enabled to access at least one entry of a Translation Look-aside Buffer (TLB) of the processor to obtain an indicator of the particular eviction policy.

26. The apparatus of claim 17, wherein the first one or more hardware logic units are further enabled to compare the virtual address to one or more programmable registers of the processor to obtain an indicator of the particular eviction policy, the programmable registers indicating one or more address ranges.

27. The apparatus of claim 17, wherein the virtual address is one of at least two virtual addresses, and further comprising an address modification policy hardware logic unit of the processor, enabled to determine respective address modification policies for each of the at least two virtual addresses, and further enabled, in response to the respective address modification policies, to modify each of the at least two virtual addresses to produce respective modified virtual addresses.

28. A system comprising:
hardware means for determining, from a plurality of eviction policies, a particular eviction policy associated with information to be retained in a cache of a processor;
hardware means for selecting, from a plurality of lines of the cache, a particular one of the lines to evict from the cache based at least in part on the particular eviction policy, the cache being an N-way cache, and the particular line being from any of the N-ways of the N-way cache, the selecting comprising ascertaining an eviction policy for a trial line of the cache, and when the trial line eviction policy is random, randomly selecting one of the lines of the cache as the particular line and otherwise selecting the trial line as the particular line;
hardware means for copying an indicator of the particular eviction policy into the particular line;
wherein the hardware means for determining is responsive to an address associated with the information; and
wherein the particular line is simultaneously subject to eviction in accordance with the particular eviction policy as well as at least one other eviction policy of the plurality of eviction policies.

29. The system of claim 28, wherein the hardware means for determining comprises one or more of
hardware means for accessing at least one entry of at least one page table,
hardware means for accessing at least one entry of a Translation Look-aside Buffer (TLB) of the processor, and
hardware means for comparing the address to one or more programmable registers of the processor, the programmable registers indicating one or more address ranges.

30. The system of claim 28, wherein the address is one of at least two addresses, and further comprising:
hardware means for generating the at least two addresses;
hardware means for determining respective address modification policies for each of the at least two addresses; and
hardware means for, in response to the respective address modification policies, modifying each of the at least two addresses to produce respective modified addresses.

* * * * *